United States Patent
Sogawa et al.

(10) Patent No.: US 8,203,642 B2
(45) Date of Patent: Jun. 19, 2012

(54) SELECTION OF AN AUTO FOCUSING METHOD IN AN IMAGING APPARATUS

(75) Inventors: Hisamo Sogawa, Hyogo (JP); Shinichi Fujii, Osaka (JP); Kazumi Kageyama, Osaka (JP); Toshio Katayama, Osaka (JP); Masato Yamaguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 502 days.

(21) Appl. No.: 11/859,262

(22) Filed: Sep. 21, 2007

(65) Prior Publication Data

US 2008/0118238 A1 May 22, 2008

(30) Foreign Application Priority Data

Nov. 17, 2006 (JP) .................... 2006-311729

(51) Int. Cl.
*H04N 5/232* (2006.01)
(52) U.S. Cl. ........ 348/345; 348/353; 348/354; 348/355; 348/208.12; 348/346; 396/89
(58) Field of Classification Search ............ 348/326, 348/208.12, 345, 346, 353–355; 396/89
See application file for complete search history.

(56) References Cited

U.S. PATENT DOCUMENTS

| 2001/0026683 | A1* | 10/2001 | Morimoto et al. | ............... 396/89 |
| 2003/0020825 | A1* | 1/2003 | Higuma et al. | ............... 348/354 |
| 2004/0057712 | A1* | 3/2004 | Sato et al. | ............... 396/89 |

FOREIGN PATENT DOCUMENTS

| JP | 7-318788 | 12/1995 |
| JP | 08-094916 | 4/1996 |
| JP | 10-26725 | 1/1998 |
| JP | 10-229516 | 8/1998 |
| JP | 2001-281530 | 10/2001 |
| JP | 2003-302571 | 10/2003 |
| JP | 2004-191674 | 7/2004 |
| JP | 2005-189876 | 7/2005 |
| JP | 2005-221602 | 8/2005 |
| JP | 2005-292517 | 10/2005 |

OTHER PUBLICATIONS

U.S. Appl. No. 12/210,589, filed Sep. 15, 2008, Fujii.
U.S. Appl. No. 12/210,560, filed Sep. 15, 2008, Fujii.
Office Action issued Jan. 20, 2011, in Japanese Patent Application No. 2008-282861, filed Nov. 4, 2008.
U.S. Appl. No. 13/155,684, filed Jun. 8, 2011, Fujii.

* cited by examiner

*Primary Examiner* — Usman Khan
(74) *Attorney, Agent, or Firm* — Oblon, Spivak, McClelland, Maier & Neustadt, L.L.P.

(57) ABSTRACT

An imaging apparatus includes an imaging device receiving light from an object through an imaging lens at a predetermined imaging plane and performing photoelectric conversion of an object image to generate a captured image; a phase-difference detector for receiving the light from the object and generating a phase-difference detection signal corresponding to a focus level of the object image; an evaluation-value calculator for calculating a predetermined evaluation value corresponding to a contrast of the object image on the basis of the captured image; and a determining unit for selecting an optimum AF method from among a plurality of AF methods in which the phase-difference detection signal obtained by the phase-difference detecting unit and the predetermined evaluation value based on the captured image are used selectively or in combination, the optimum AF method being selected in accordance with image-capturing conditions of the object.

12 Claims, 22 Drawing Sheets

FIG. 18

| PIXEL POSITION | IN FOCUS L1 | | | SLIGHTLY OUT OF FOCUS L2 | | | OUT OF FOCUS L3 | | |
|---|---|---|---|---|---|---|---|---|---|
| | INPUT DATA (IN FOCUS) | OUTPUT DATA DA (1, 0, -1) | OUTPUT DATA DB (1, 0, 0, 0, -1) | INPUT DATA (SLIGHTLY OUT OF FOCUS) | OUTPUT DATA DA (1, 0, -1) | OUTPUT DATA DB (1, 0, 0, 0, -1) | INPUT DATA (OUT OF FOCUS) | OUTPUT DATA DA (1, 0, -1) | OUTPUT DATA DB (1, 0, 0, 0, -1) |
| 1 | 30 | - | - | - | - | - | - | - | - |
| 2 | 45 | - | - | 25 | - | - | 20 | - | - |
| 3 | 68 | - | - | 35 | - | - | 26 | - | - |
| 4 | 101 | 84 | 183 | 49 | 47 | 99 | 34 | 23 | 43 |
| 5 | 152 | 127 | 274 | 69 | 66 | 139 | 44 | 30 | 63 |
| 6 | 228 | 190 | 411 | 96 | 92 | 195 | 57 | 39 | 82 |
| 7 | 342 | 285 | 202 | 134 | 129 | 99 | 74 | 51 | 43 |
| 8 | 513 | 12 | 16 | 188 | 7 | 10 | 97 | 4 | 6 |
| 9 | 354 | 269 | 174 | 264 | 119 | 81 | 125 | 45 | 32 |
| 10 | 244 | 185 | 397 | 195 | 88 | 184 | 100 | 36 | 74 |
| 11 | 168 | 128 | 274 | 145 | 65 | 136 | 80 | 29 | 59 |
| 12 | 116 | 88 | 189 | 107 | 48 | 101 | 64 | 23 | 47 |
| 13 | 80 | - | - | 79 | - | - | 51 | - | - |
| 14 | 55 | - | - | 59 | - | - | 41 | - | - |
| 15 | 38 | - | - | 44 | - | - | 33 | - | - |
| | | | | 32 | - | - | 26 | - | - |
| SUM | - | 1367 | 2118 | - | 662 | 1046 | - | 282 | 455 |
| MAXIMUM VALUE | - | 285 | 411 | - | 129 | 195 | - | 51 | 82 |
| RATIO RC OF MAX VALUE OF DB TO MAX VALUE OF DA | - | 1.44 | | | 1.51 | | | 1.60 | |
| RATIO RD OF SUM OF DB TO SUM OF DA | - | 1.55 | | | 1.58 | | | 1.62 | |

SELECTION OF AN AUTO FOCUSING METHOD IN AN IMAGING APPARATUS

CROSS REFERENCES TO RELATED APPLICATIONS

The present invention contains subject matter related to Japanese Patent Application JP 2006-311729 filed in the Japanese Patent Office on Nov. 17, 2006, the entire contents of which are incorporated herein by reference.

BACKGROUND OF THE INVENTION

1. Field of the Invention

The present invention relates to an imaging apparatus, such as a digital camera.

2. Description of the Related Art

Imaging apparatuses, such as digital cameras, capable of executing two auto focusing (AF) methods (e.g., a phase-difference AF method which enables relatively high speed auto focusing and a contrast AF method which enables relatively high accuracy auto focusing) have been developed (see Japanese Unexamined Patent Application Publication No. 2001-281530).

According to Japanese Unexamined Patent Application Publication No. 2001-281530, a first mode in which the contrast AF method is executed or a second mode in which the phase-difference AF method is mainly executed is selected in accordance with a setting operation performed by an operator. Then, an AF operation is performed in the selected mode. In the first mode, the phase-difference AF method is carried out when a shutter button is pressed halfway. In the second mode, the phase-difference AF method is carried out when the shutter button is pressed halfway and then the contrast AF method is carried out when the shutter button is fully pressed.

SUMMARY OF THE INVENTION

As described above, according to the technique described in Japanese Unexamined Patent Application Publication No. 2001-281530, settings regarding the AF method are switched by the operator.

However, the operator who performs the switching operation is often unable to determine the suitable AF method at the time, and it is therefore difficult for the operator to quickly switch to the suitable the AF mode.

Japanese Unexamined Patent Application Publication No. 10-229516 describes a technique for switching between the two AF methods in accordance with a temperature detected by a temperature sensor. However, such a technique is not sufficient for adequately switching between the two AF methods.

Therefore, it is desirable to provide an imaging apparatus that is capable of executing a plurality of AF methods and adequately selecting an AF method to be used from the plurality of AF methods.

An imaging apparatus according to an embodiment of the present invention includes an imaging device receiving light from an object through an imaging lens at a predetermined imaging plane and performing photoelectric conversion of an object image to generate a captured image; phase-difference detecting means for receiving the light from the object and generating a phase-difference detection signal corresponding to a focus level of the object image; evaluation-value calculating means for calculating a predetermined evaluation value corresponding to a contrast of the object image on the basis of the captured image; and determining means for selecting an optimum AF method from among a plurality of AF methods in which the phase-difference detection signal obtained by the phase-difference detecting means and the predetermined evaluation value based on the captured image are used selectively or in combination, the optimum AF method being selected in accordance with image-capturing conditions of the object.

According to the embodiment of the present invention, the imaging apparatus is capable of executing a plurality of AF methods, and a most suitable AF method for the image-capturing conditions of the object is selected. Thus, an AF method to be used can be adequately selected from the plurality of AF methods.

BRIEF DESCRIPTION OF THE DRAWINGS

FIG. 18 is a table illustrating numerical examples.

DESCRIPTION OF THE PREFERRED EMBODIMENTS

Embodiments of the present invention will be described below with reference to the accompanying drawings.

1. First Embodiment 1-1. Schematic Structure

Figure 1:
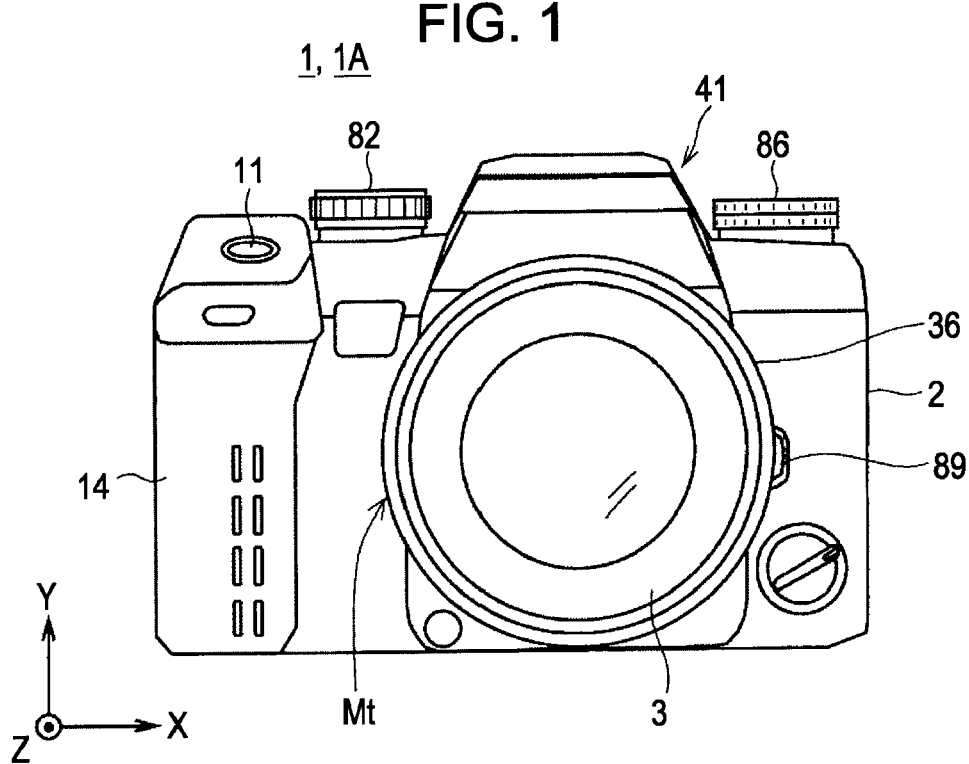
FIG. 1 is an external front view of an imaging apparatus.
Figure 2:
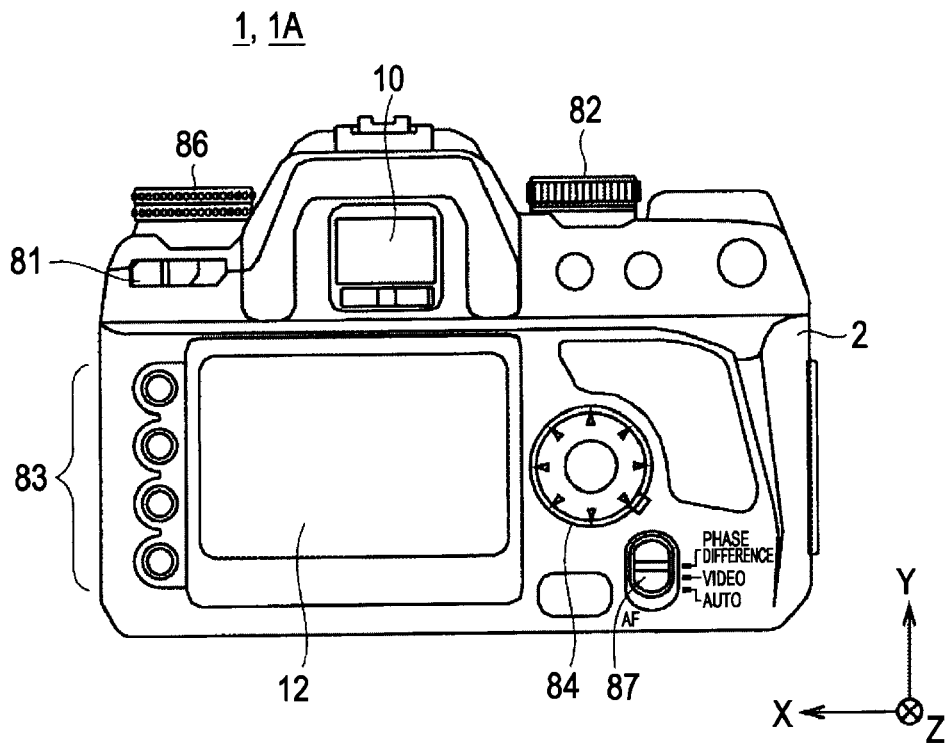
FIG. 2 is an external rear view of the imaging apparatus.

FIGS. 1 and 2 are diagrams illustrating the external view of an imaging apparatus 1(1A) according to a first embodiment of the present invention. FIG. 1 is an external front view of the imaging apparatus 1. FIG. 2 is an external rear view of the imaging apparatus 1. The imaging apparatus 1A is a single-lens reflex digital camera having a replaceable lens.

As shown in FIG. 1, the imaging apparatus 1A includes a camera main body (camera body) 2. A replaceable imaging lens unit (replaceable lens) 3 is detachably attached to the camera main body 2.

The imaging lens unit 3 basically includes a barrel 36, a lens group 37 (see FIG. 3) disposed in the barrel 36, an aperture stop, etc. The lens group 37 (imaging optical system) includes a focusing lens and the like that move along an optical axis to change a focal position.

The camera main body 2 has an annular mount portion Mt to which the imaging lens unit 3 is attached at a central position on the front. A release button 89 for detaching the imaging lens unit 3 is provided near the annular mount portion Mt.

The camera main body 2 has a mode-setting dial 82 at an upper left position on the front and a control-value-setting dial 86 at an upper right position on the front. The mode-setting dial 82 is operated to set (switch between) various operating modes (image-capturing modes including a portrait mode, a landscape mode, and a full-auto image-capturing mode, a playback mode for playing back the captured images, a communication mode for communicating data with external apparatuses, etc.). The control-value-setting dial 86 is operated to set control values used in the respective image-capturing modes.

The camera main body 2 includes a grip portion 14 that can be gripped by a user at the left end on the front. A release button 11 for issuing a command to start exposure is provided on a top surface of the grip portion 14. A battery-accommodating chamber and a card-accommodating chamber are provided in the grip portion 14. The battery-accommodating chamber accommodates, for example, four AA batteries as a power source for the camera. The card-accommodating chamber accommodates a memory card 90 (see FIG. 3) in a detachable manner. The memory card 90 stores data of captured images.

The release button 11 is capable of detecting two states thereof: a half-pressed state (S1) and a fully pressed state (S2). When the release button 11 is pressed halfway and the state S1 is detected, preparation operations for acquiring an object's still image to be recorded (final captured image) are performed. For example, an AF control operation and an AE control operation are performed. When the release button 11 is further pressed and the state S2 is detected, an image-capturing operation for acquiring the final captured image is performed. In the image-capturing operation, an exposure operation is performed for an object image (optical image of the object) using an imaging device 5 (described below) and an image signal obtained by the exposure operation is subjected to image processing.

Referring to FIG. 2, an AF mode switch 87 is provided at a lower right position on the back of the camera main body 2. The switch 87 is a three-position slide switch capable of selecting one of a plurality of modes (three modes MD1, MD2, and MD3 in this example) as an AF mode. More specifically, a desired AF mode is selected from three modes including a phase-difference AF mode MD1, a contrast AF mode MD2, and an automatic switching mode MD3 in accordance with the position of a slide portion included in the switch 87. A phase-difference AF method is continuously used in the phase-difference AF mode MD1, and a contrast AF method is continuously used in the contrast AF mode MD2. In the automatic switching mode MD3, an AF method to be used is automatically switched between the phase-difference AF method and the contrast AF method.

In FIG. 2, a finder window (ocular window) 10 is provided at an upper central position on the back of the camera main body 2. The user can look through the finder window 10 and determine the composition by visually checking an optical image of the object that is guided through the imaging lens unit 3. In other words, a composition determination operation can be performed using the optical finder.

In the imaging apparatus 1A according to the present embodiment, a plurality of images (live view images) obtained by the imaging device in time series are successively displayed on a rear monitor 12 (described below). The operator can also determine the composition using the live view images shown in the manner of a moving image.

As described in more detail below, the composition determination operation is switched between the operation using the optical finder and the operation using the live view display in accordance with the AF method used at the time and the like.

Referring to FIG. 2, the rear monitor 12 is provided at a central position on the back of the camera main body 2. The rear monitor 12 includes, for example, a color liquid crystal display (LCD). The rear monitor 12 displays a menu screen used for setting image-capturing conditions and the like. In addition, in the playback mode, the rear monitor 12 shows a playback display of captured images stored in the memory card 90. In addition, depending on the selected AF mode, the rear monitor 12 displays a plurality of images (live view images) obtained by the imaging device 5 in time series in the manner of a moving image.

A main switch 81 is provided at an upper left position of the rear monitor 12. The main switch 81 is a two-position slide switch. The power is turned off when the main switch 81 is moved left to an OFF position, and is turned on when the main switch 81 is moved right to an ON position.

A direction selection key 84 is provided on the right of the rear monitor 12. The direction selection key 84 includes an annular operation button and is capable of individually detecting pressing operations of the operation button at four positions including top, bottom, left and right positions, and another four positions including upper left, upper right, lower left, and lower right positions. In addition to the above-described pressing operations at eight positions in total, the direction selection key 84 can also detect a pressing operation of a push button provided at the center.

A setting button group 83 including a plurality of buttons for setting the menu screen, deleting images, etc., is provided on the left of the rear monitor 12.

1-2. Functional Blocks

Figure 3:
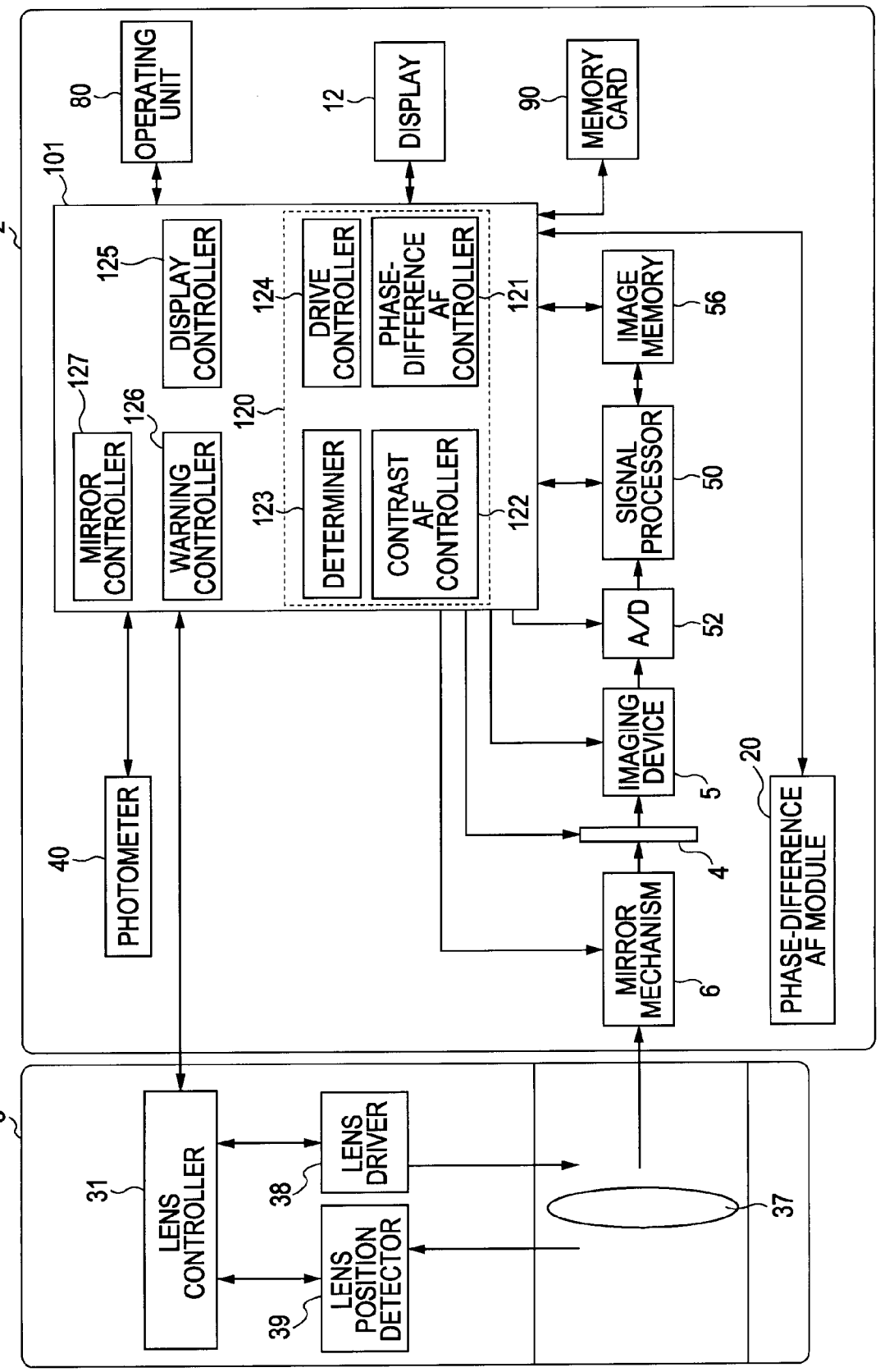
FIG. 3 is a block diagram illustrating the functional structure of the imaging apparatus.

Functions of the imaging apparatus 1A will now be described with reference to FIG. 3. FIG. 3 is a block diagram illustrating the functional structure of the imaging apparatus 1A.

As shown in FIG. 3, the imaging apparatus 1A includes a phase-difference AF module (hereinafter simply called an AF module) 20, a photometer 40, an operating unit 80, an overall controller 101, a mirror mechanism 6, a shutter 4, an imaging device 5, an A/D converter circuit 52, a digital signal processor circuit 50, and an image memory 56.

The AF module 20 has a phase-difference detecting function. More specifically, the AF module 20 receives light from the object (light that passes through the mirror mechanism 6) and generates a phase-difference detection signal corresponding to a focus level of the object image.

The photometer 40 has a function of measuring the brightness of the object image, in other words, the intensity of light from the object. The AE control operation is performed on the basis of the output from the photometer 40, whereby the brightness of the captured image is adjusted.

The operating unit 80 includes various switches and buttons including the release button 11 (see FIG. 1). The overall controller 101 performs various operations in response to an input operation performed by the user using the operating unit 80.

The overall controller 101 includes a microcomputer having a CPU, a memory, a ROM, etc. The overall controller 101 reads programs stored in the ROM and causes the CPU to execute the programs, thereby carrying out various functions.

The overall controller 101 executes the above-described programs to carry out the functions of an AF controller 120, a display controller 125, a warning controller 126, a mirror controller 127, etc.

The AF controller 120 performs an AF operation in which an imaging lens is driven using one of AF methods that is most suitable at the time for the conditions under which an image of the object is captured. The AF controller 120 includes a phase-difference AF controller 121, a contrast AF controller 122, a determiner 123, and a drive controller 124.

The phase-difference AF controller 121 performs an auto focusing (AF) operation by the phase-difference AF method. More specifically, the phase-difference AF controller 121 performs an in-focus lens position determination operation for determining the position (in-focus lens position) of the imaging lens (to be more specific, the focusing lens) in an in-focus state on the basis of the phase-difference detection signal obtained by the AF module 20. In addition, the phase-difference AF controller 121 operates in association with the drive controller 124 to perform an AF driving operation (lens-driving operation) for moving the imaging lens (focusing lens) to the determined in-focus lens position.

The contrast AF controller 122 performs an auto focusing (AF) operation by the contrast AF method. More specifically, the contrast AF controller 122 performs an evaluation-value calculating operation for obtaining evaluation values for contrasts of a plurality of object images corresponding to different lens positions. Then, the contrast AF controller 122 performs an in-focus lens position determination operation for determining the lens position at which the evaluation value is optimized (for example, minimized) as an in-focus lens position. In addition, the contrast AF controller 122 operates in association with the drive controller 124 to perform an AF driving operation for moving the imaging lens (focusing lens) to the determined in-focus lens position.

The determiner 123 determines an optimum AF method on the basis of conditions under which an image of an object is captured. The optimum AF method is selected from among a plurality of AF methods including the phase-difference AF method using the phase-difference detection signal and the contrast AF method using the evaluation values for the captured images. The result of the determination performed by the determiner 123 (that is, the optimum AF method) is indicated in, for example, "recommendation display" on the rear monitor 12, so that the operator can check the result of the determination. The determination operation performed by the determiner 123 will be described in detail below.

The drive controller 124 controls a lens-driving operation. The drive controller 124 uses the optimum AF method at the time that is selected by the determiner 123 from among the plurality of AF methods on the basis of the conditions under which the object image is captured. The drive controller 124 operates in association with the phase-difference AF controller 121 and/or the contrast AF controller 122 to actually drive the imaging lens.

The phase-difference AF controller 121 and the contrast AF controller 122 communicate with a lens controller 31 included in the imaging lens unit 3 via the drive controller 124 and transmit a control signal to the lens controller 31. Accordingly, the lens driver 38 is driven so as to move the focusing lens included in the lens group 37 in the imaging lens unit 3 along an optical axis. The position of the focusing lens is detected by a lens position detector 39 included in the imaging lens unit 3. Data representing the position of the focusing lens is transmitted from the lens controller 31 to the overall controller 101 in the main body.

The display controller 125 controls display contents shown on a display unit including the rear monitor 12. For example, the above-described recommendation display is presented under the control of the display controller 125.

The warning controller 126 issues a warning when the AF method switches. The warning controller 126 operates, for example, in association with the display controller 125 to control a warning display. More specifically, if the currently used AF method differs from an AF method to be used when the half-pressed state S1 of the release button 11 is detected, the rear monitor 12 is controlled so as to present a display for informing the operator (user) of the situation. Due to this warning, the operator recognizes that the AF method will be switched. In addition, when the AF method is changed, it means that a composition determination method is also changed due to the relationship between the AF method and the composition determination method, as described below. Therefore, the warning that the AF method will be changed is equivalent to a warning that the composition determination method will be changed.

The mirror controller 127 controls an operation of switching between a state in which the mirror mechanism 6 is removed from an optical path (mirror-up state) and a state in which the mirror mechanism 6 blocks the optical path (mirror-down state). The mirror controller 127 switches between the mirror-up state and the mirror-down state by driving a mirror switch motor (not shown).

The imaging device 5 is a CCD sensor (hereinafter simply called a CCD) in this example. The imaging device 5 receives an object image at an imaging plane thereof, converts the object image into an electrical signal using a photoelectric conversion effect, and generates an image signal corresponding to a final captured image. The imaging device 5 can also be referred to as an image capturing sensor (image sensor).

The imaging device 5 receives drive control signals (an accumulation start signal and an accumulation stop signal) from a timing control circuit (not shown) and performs an exposure operation for an object image formed on the light-receiving plane (imaging plane) in response to the received drive control signals. In the exposure operation, charge accumulation is performed by causing photoelectric conversion. As a result, an image signal corresponding to the object image is obtained.

The image signal (analog signal) obtained by the imaging device 5 is converted into a digital signal by the A/D converter circuit 52. The thus-obtained digital image signal is input to the digital signal processor circuit 50.

The digital signal processor circuit 50 subjects the image signal input from the A/D converter circuit 52 to digital signal processes. More specifically, a black-level correction process, a white balance (WB) process, a γ correction process, etc., are performed. After the signal processes, the image signal (image data) is stored in the image memory 56.

The image memory 56 is a high-speed-accessible image memory for temporarily storing the generated image data and has a capacity large enough to store image data of a plurality of frames.

In an image-capturing operation, the image data that is temporarily stored in the image memory 56 is subjected to image processing (for example, compressing process) by the overall controller 101 as necessary and stored in the memory card 90.

1-3. Component Arrangement in Composition Determination Process

An image-capturing operation including a composition determination operation performed by the imaging apparatus 1A will now be described. As described above, in the imaging apparatus 1A, the composition determination operation (framing) can be performed using the optical finder (also called an optical view finder (OVF)) including a finder optical system. In addition, the composition determination operation can also be performed using live view images displayed on the rear monitor 12 (described below). A finder function provided by the imaging device 5 and the rear monitor 12 is called an electronic view finder (EVF) because the optical image of the object is converted into the electronic data and is then visualized.

In the imaging apparatus 1A, when the operator operates the switch 87 to select an AF mode, the selected AF mode is set and a composition determination method is automatically determined in accordance with the selected AF mode.

More specifically, if the phase-difference AF mode MD1 is selected, the phase-difference AF method is continuously selected as the AF method and the optical finder is continuously used in the composition determination operation. In this case, it is difficult to perform the composition determination operation using the live view display.

If the contrast AF mode MD2 is selected, the contrast AF method is continuously selected as the AF method and the live view display is continuously used in the composition determination operation. In this case, it is difficult to perform the composition determination operation using the optical finder.

If the automatic switching mode MD3 is selected, the imaging apparatus 1A selects a suitable AF method in accordance with the conditions under which the object image is captured. The composition determination method is determined in accordance with the selected AF method. More specifically, while the phase-difference AF operation is being performed, only the composition determination operation using the optical finder is enabled and it is difficult to perform the composition determination operation using the live view display. While the contrast AF operation is being performed, only the composition determination operation using the live view display is enabled and it is difficult to perform the composition determination operation using the optical finder.

In the imaging apparatus 1A, the AF method and the composition determination method are in the above-described relationship.

Figure 4:
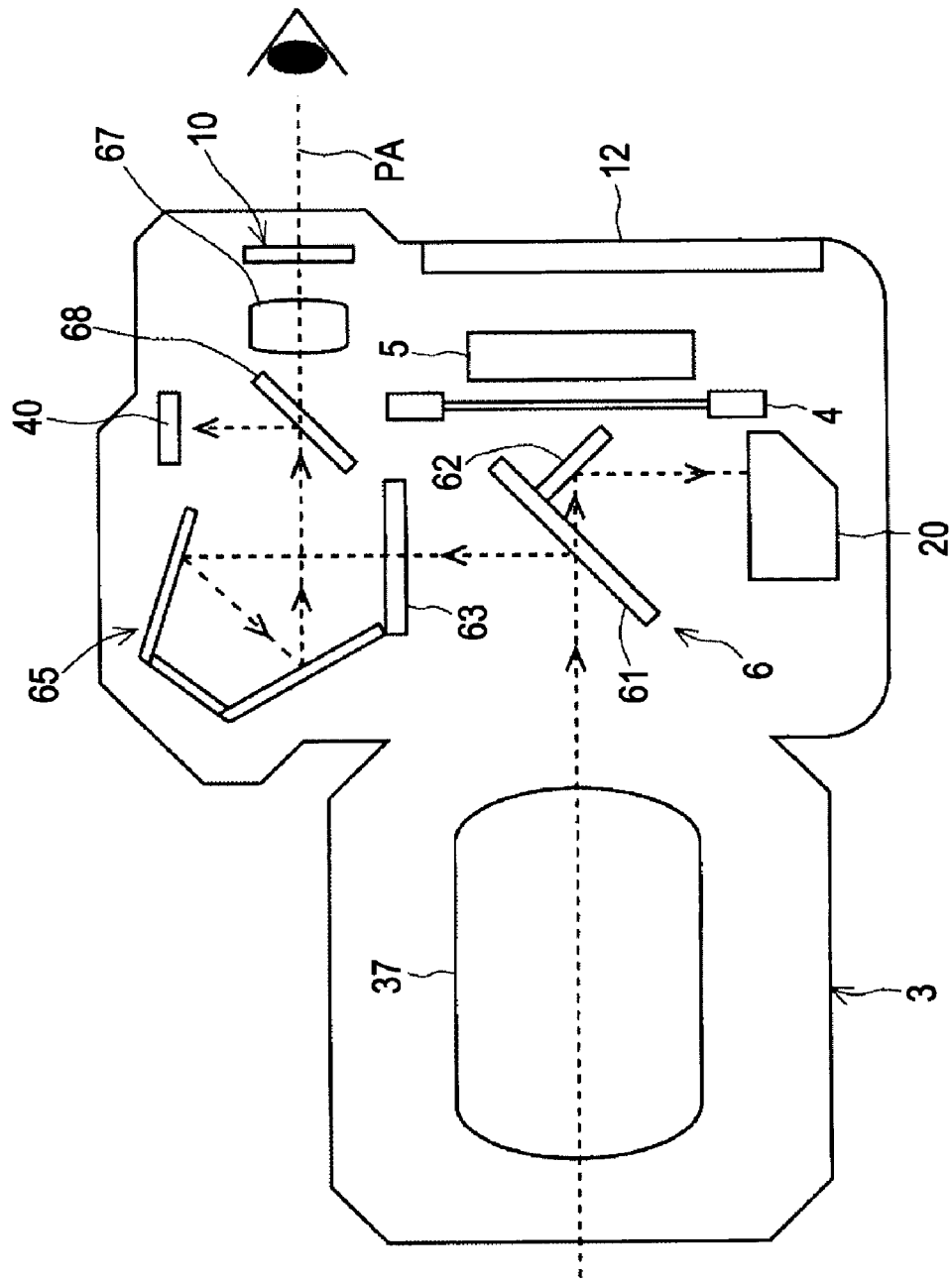
FIG. 4 is a sectional view of the imaging apparatus in an OVF mode.
Figure 5:
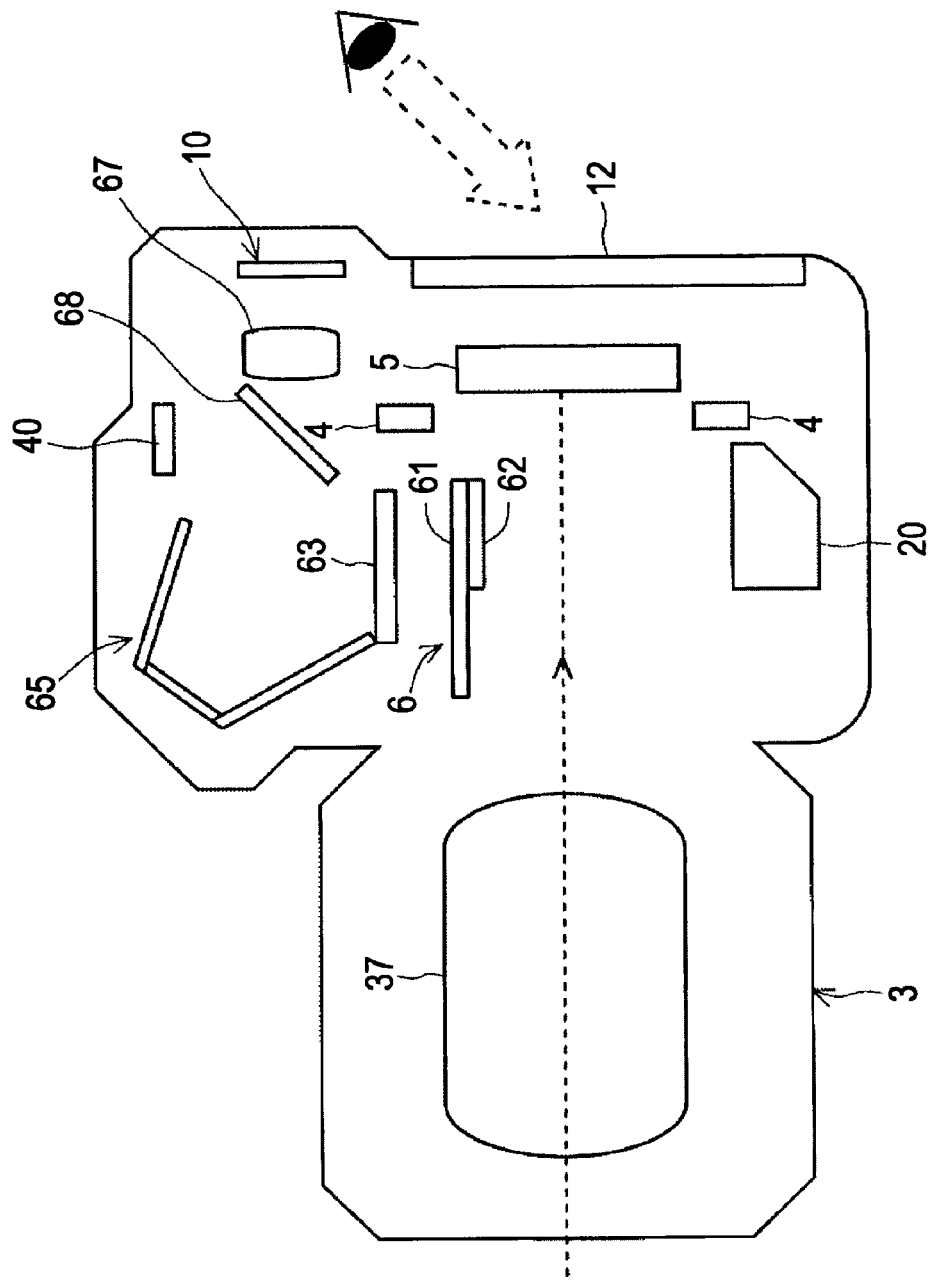
FIG. 5 is a sectional view of the imaging apparatus in an EVF mode.

FIGS. 4 and 5 are sectional views of the imaging apparatus 1A. FIG. 4 illustrates the composition determination operation using the optical finder (or the OVF). FIG. 5 illustrates the composition determination operation using the live view display (or the EVF).

In the composition determination operation using the optical finder, the mirror mechanism 6 is set in the mirror-down state (see FIG. 4) until the state of the release button 11 is changed to the fully pressed state S2.

More specifically, as shown in FIG. 4, the mirror mechanism 6 is arranged on an optical path (imaging optical path) that extends from the imaging lens unit 3 to the imaging device 5. The mirror mechanism 6 includes a main mirror 61 (main reflective surface) for reflecting light from the imaging optical system upward. The main mirror 61 is, for example, a half mirror that allows a portion of the light from the imaging optical system to pass therethrough. The mirror mechanism 6 also includes a sub mirror 62 (sub reflective surface) for reflecting light that passes through the main mirror 61 downward. The light reflected downward by the sub mirror 62 is guided to the AF module 20, which generates the phase-difference detection signal.

Referring to FIG. 4, the main mirror 61 and the sub mirror 62 included in the mirror mechanism 6 are arranged on the optical path of the object image from the imaging lens unit 3. In this state, the object image is guided to the finder window 10 through the main mirror 61, a pentamirror 65, and an eyepiece 67. Thus, the finder optical system including the main mirror 61, the pentamirror 65, and the eyepiece 67 is capable of guiding an observation light beam, which is a light beam emitted from the imaging optical system and reflected by the main mirror 61, to the finder window 10. A portion of light that reaches an optical element 68 (half mirror) disposed between the pentamirror 65 and the eyepiece 67 is reflected by the optical element 68 and guided to the photometer 40.

In the composition determination operation using the live view display, the mirror mechanism 6 is set in the mirror-up state (see FIG. 5) until the state of the release button 11 is changed to the fully pressed state S2. In this case, the object image from the imaging lens unit 3 is input to the imaging device 5.

More specifically, as shown in FIG. 5, the mirror mechanism 6 is removed from the imaging optical path. In more detail, the main mirror 61 and the sub mirror 62 are moved upward so as not to block the light (object image) from the imaging optical system. The light from the imaging lens unit 3 passes through the shutter 4 in an open state and reaches the imaging device 5. The imaging device 5 generates an object image signal based on the received light by causing photoelectric conversion. Thus, light from the object is guided to the imaging device 5 through the imaging lens unit 3, so that the image (image data) of the object can be captured.

The imaging device 5 captures object images based on the incident light at predetermined time intervals. The live view display is presented using the images captured in time series. In addition, the contrast AF operation is performed on the basis of a plurality of images corresponding to different lens positions.

Irrespective of the composition determination method, when the state of the release button 11 is changed to the fully pressed state S2, the mirror mechanism 6 is set to the mirror-up state (see FIG. 5) and the exposure operation is started. Thus, an operation of acquiring the object's still image to be recorded (final captured image) is performed.

More specifically, as shown in FIG. 5, the mirror mechanism 6 is removed from the imaging optical path during the exposure operation. In more detail, the main mirror 61 and the sub mirror 62 are moved upward so as not to block the light (object image) from the imaging optical system. The light from the imaging lens unit 3 reaches the imaging device 5 at the time when the shutter 4 is opened. The imaging device 5 causes photoelectric conversion to generate an object image signal on the basis of the received light beam. Thus, the light from the object reaches the imaging device 5 through the imaging lens unit 3, so that the captured image (captured image data) of the object can be obtained.

1-4. Operation

Overall Operation

Figure 6:
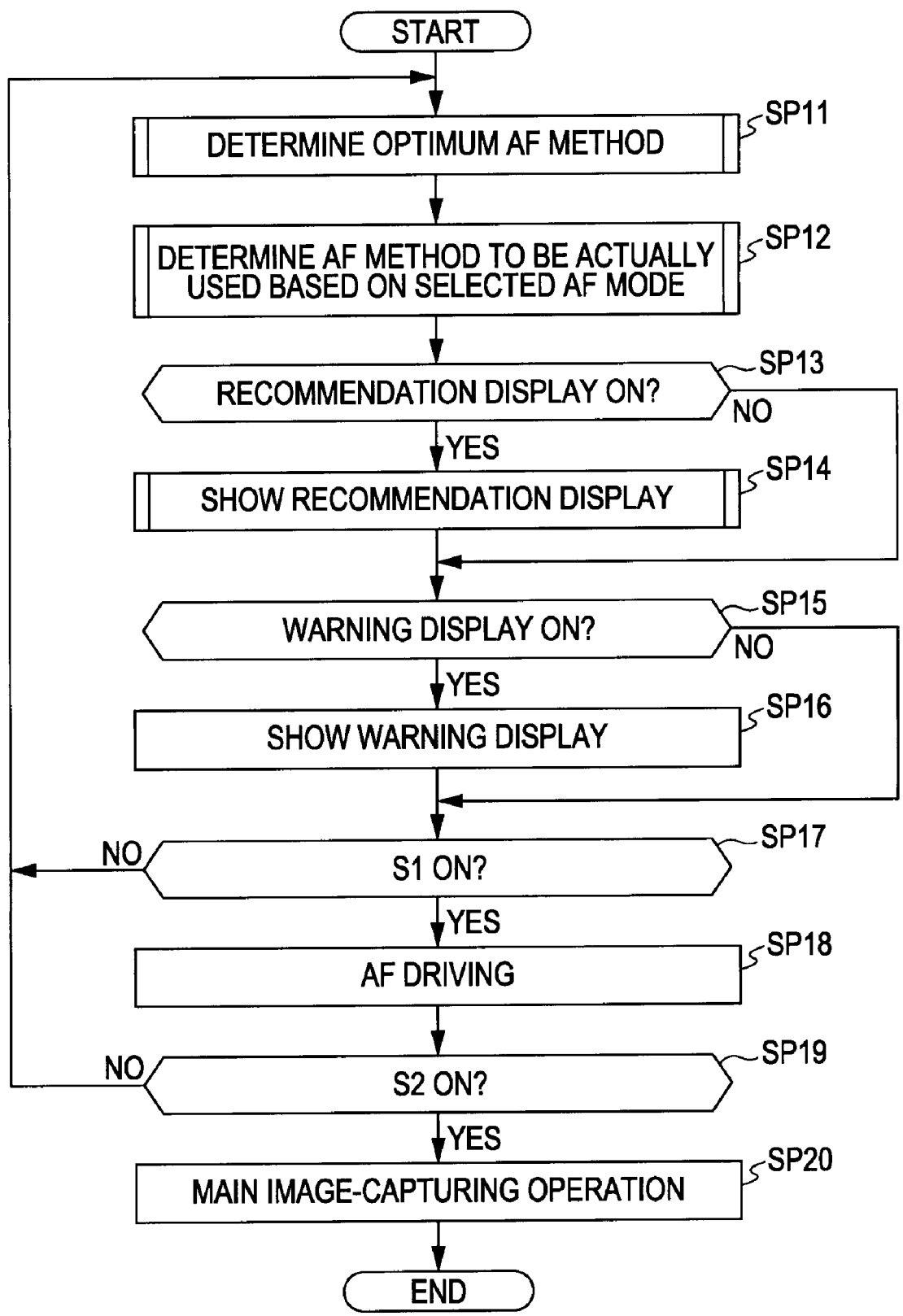
FIG. 6 is a flowchart of the overall operation performed in the imaging apparatus.

FIGS. 6 to 11 are flowcharts of operations performed by the imaging apparatus 1A. FIG. 6 is a flowchart of the overall operation and FIGS. 7 to 11 are flowcharts of detailed operations performed in steps SP11, SP30, SP40, SP12, and SP14, respectively, in FIG. 6.

First, the overall operation will be described with reference to FIG. 6.

The operation of FIG. 6 is performed when the power is turned on by the operation of the main switch 81 and "image-capturing mode" is selected by the operation of the mode-setting dial 82.

It is also assumed that the AF-mode selection setting, recommended-mode display (recommendation display) setting, and warning setting are already determined (updated) by predetermined operations.

As described above, the AF-mode selection setting is determined (updated) in response to an AF-mode selecting operation performed by the operator.

Figure 12:
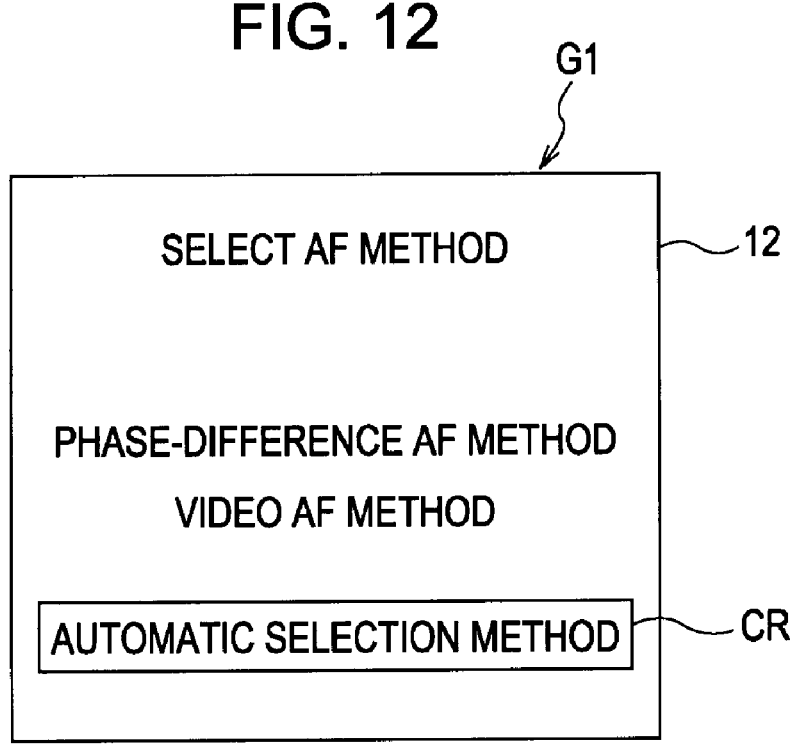
FIG. 12 shows an AF-mode selection setting screen.

Although the switch 87 is used to select the AF mode in this example, the present invention is not limited to this. For example, as shown in FIG. 12, the AF-mode selection setting can also be updated by an AF-mode selecting operation using a display screen (AF-mode selection setting screen) G1 and the direction selection key 84. In the screen G1 shown in FIG. 12, the automatic switching mode MD3 (described as "automatic selection method" in FIG. 12) is selected from three modes including the phase-difference AF mode MD1 ("phase-difference AF method" in FIG. 12), the contrast AF mode MD2 ("video AF method" in FIG. 12), and the automatic switching mode MD3. In the phase-difference AF mode MD1, the phase-difference AF method is constantly used. In the contrast AF mode MD2, the contrast AF method is constantly used. In the automatic switching mode MD3, an AF method is automatically selected from a plurality of AF methods including the phase-difference AF method and the contrast AF method.

Figure 13:
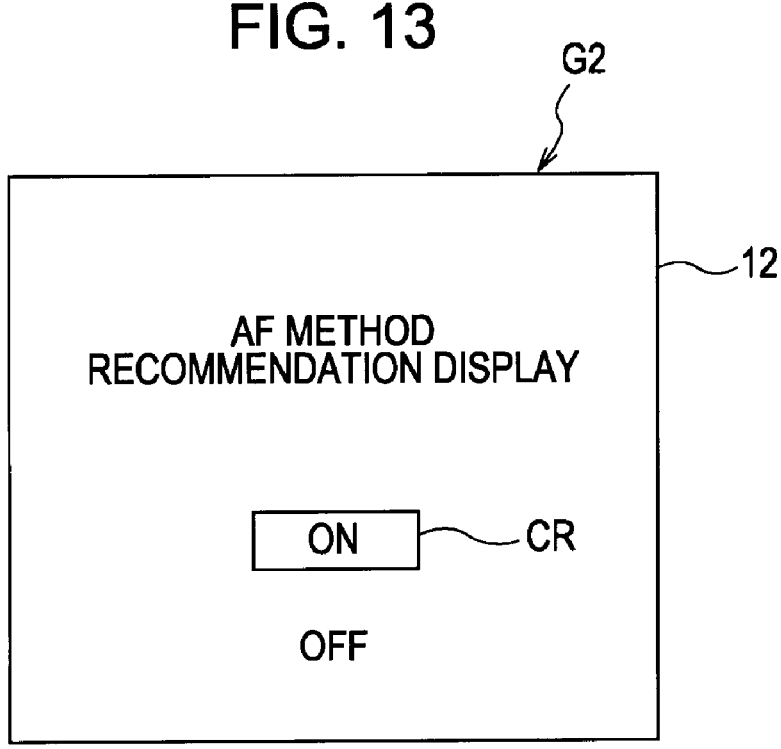
FIG. 13 shows a recommendation display setting screen.

In addition, in the imaging apparatus 1A, the recommendation display setting is determined (updated) in accordance with a recommendation-display selecting operation performed using a display screen (recommendation display setting screen) G2 shown in FIG. 13 and the direction selection key 84. More specifically, first, the direction selection key 84 is operated in the left, right, up, or down direction so as to select a desired item by moving a cursor CR in the screen G2. Then, the push button at the center of the direction selection key 84 is pressed so as to complete the selection of the desired item. FIG. 13 shows the state in which the recommendation display is turned on.

The setting regarding the ON/OFF state of the warning display (described below) is also updated in response to a setting operation performed by the operator.

The operation of FIG. 6 is performed after the above-described settings are made.

As shown in FIG. 6, steps SP11 to SP16 are repeated until it is determined that the state of the release button 11 is changed to the half-pressed state S1 in step SP17. The AF driving operation in which the imaging lens is driven is not started until it is determined that the state of the release button 11 is changed to the half-pressed state S1 in step SP17, in other words, while steps SP11 to SP16 are being repeated. When it is determined that the state of the release button 11 is changed to the half-pressed state S1, the AF driving operation in which the imaging lens is actually driven is performed in step SP18. Then, it is determined whether or not the state of the release button 11 is changed to the fully pressed state S2 in step SP19. If it is determined that the release button 11 is not in the fully pressed state S2, the process returns to step SP11, and steps SP11 to SP18 are repeated. If it is determined that the release button 11 is in the fully pressed state S2, the process proceeds to step SP20, where the image-capturing operation involving the exposure operation is started.

AF Method Determination Process

Referring to FIG. 6, a process for determining an optimum AF method is performed in step SP11. In step SP11, the optimum AF method is selected from a plurality of AF methods in accordance with various detection results corresponding to the conditions under which the object image is captured. The determination process will be described in detail below.

AF Method Correction Process

In step SP12, the determination result obtained in step SP11 is corrected in accordance with the AF-mode selection setting determined in advance by the AF-mode selecting operation. Thus, the AF method to be actually used in the AF driving operation in step SP18 is determined.

Figure 10:
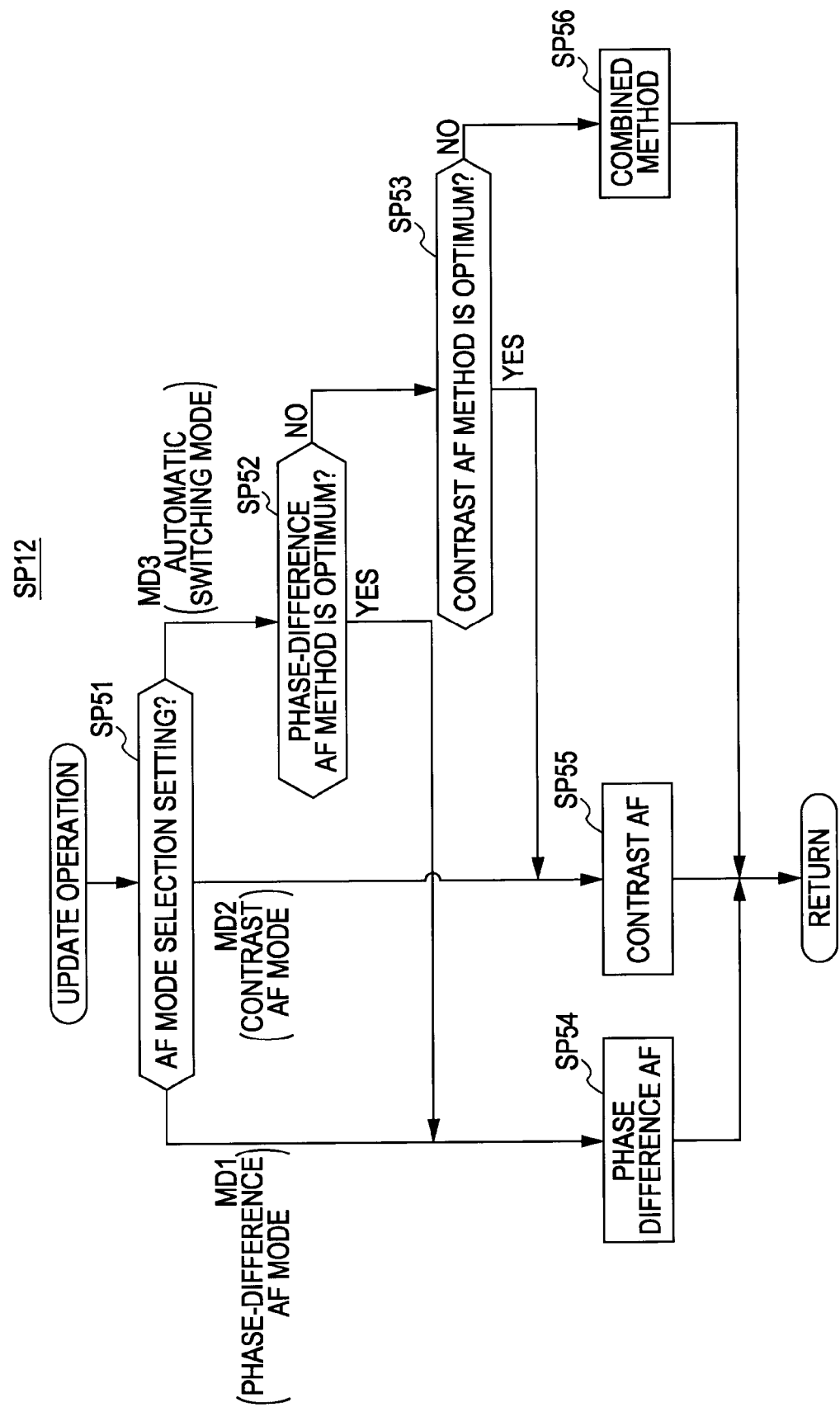
FIG. 10 is a flowchart of a detailed process performed in step SP12.

In more detail, referring to FIG. 10, if the phase-difference AF mode MD1 or the contrast AF mode MD2 is set according to the AF-mode selection setting, the corresponding AF method is set as the AF method to be used in the actual AF control operation (step SP18) irrespective of the determination result obtained in step SP11. If the phase-difference AF mode MD1 is set, the phase-difference AF method is determined as the AF method to be used in the actual AF control operation in step SP18 (steps SP51 and SP54). If the contrast AF mode MD2 is set, the contrast AF method is determined as the AF method to be used in the actual AF control operation in step SP18 (steps SP51 and SP55).

If the automatic switching mode MD3 is set according to the AF-mode selection setting, the determination result obtained in step SP11 is used. More specifically, if the phase-difference AF method is determined as the optimum AF method in step SP11, the "phase difference AF method" is selected as the AF method to be used in the actual AF control operation in step SP18 (steps SP51, SP52, and SP54). If the contrast AF method is determined as the optimum AF method in step SP11, the "contrast AF method" is selected as the AF method to be used in the actual AF control operation in step SP18 (steps SP51, SP53, and SP55). If a combined method (described next) is determined as the optimum AF method in step SP11, the "combined AF method" is selected as the AF method to be used in the actual AF control operation in step SP18 (steps SP51 and SP56).

In the "combined method", both the phase-difference AF method and the contrast AF method are used. In an example of the AF operation using the combined method, first, the AF driving operation is performed using the phase-difference AF method (see FIG. 4). Then, the arrangement of the mirror mechanism 6 is changed and the AF driving operation is performed using the contrast AF method (see FIG. 5).

In the "combined method", the phase-difference detection signal obtained by the AF module 20 and the evaluation value corresponding to the contrast are used in combination. In contrast, in the "phase-difference AF method", of the phase detection signal obtained by the AF module 20 and the evaluation value corresponding to the contrast, the phase-difference detection signal obtained by the AF module 20 is selectively used. Similarly, in the "contrast AF method", of the phase-difference detection signal obtained by the AF module 20 and the evaluation value corresponding to the contrast, the evaluation value corresponding to the contrast is selectively used.

Recommendation Display

Referring to FIG. 6 again, after steps SP11 and SP12, a recommendation display is presented if the "recommendation display setting" is set to ON (steps SP13 and SP14). If the "recommendation display setting" is set to OFF, the recommendation display is not presented.

Figure 11:
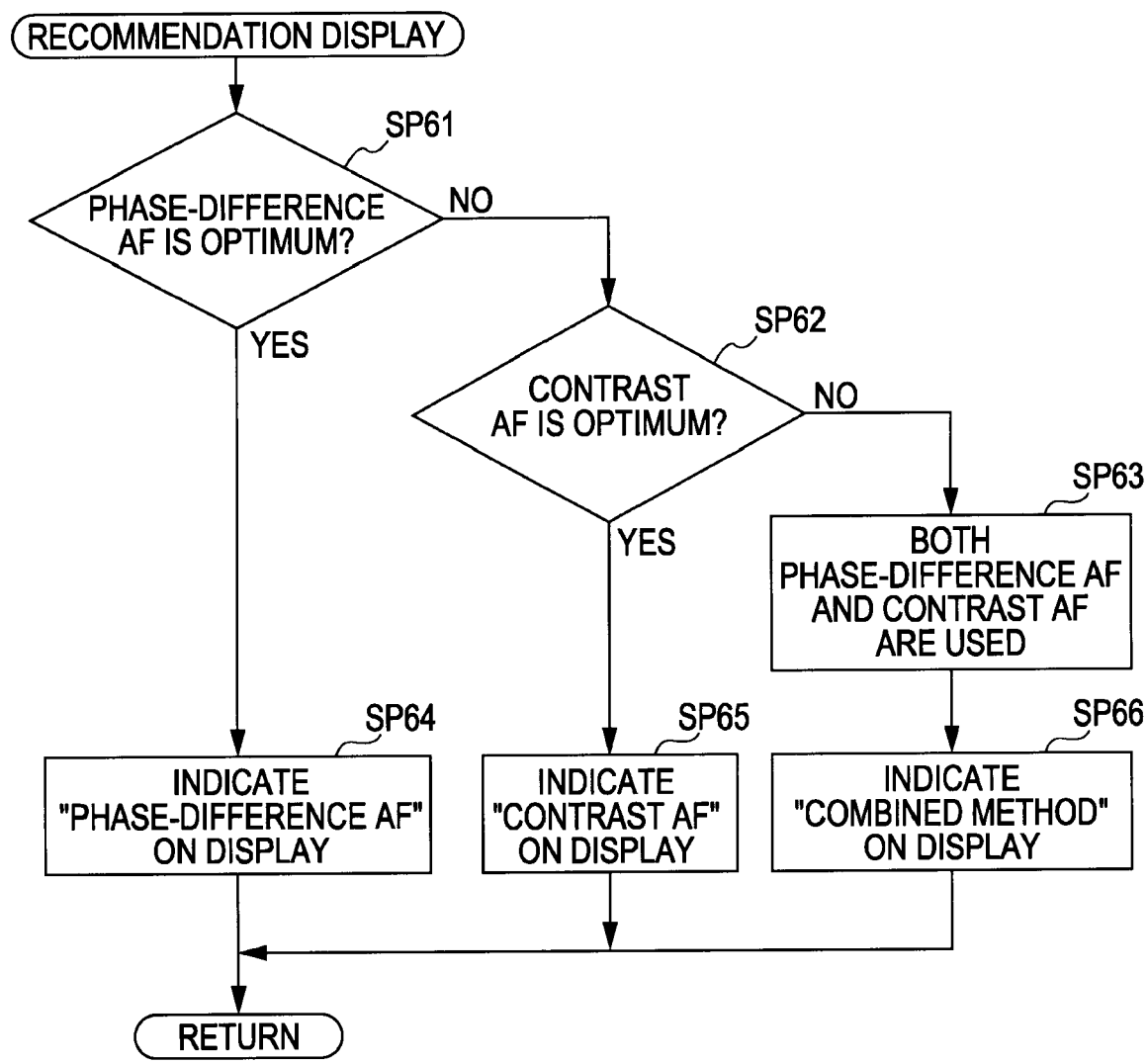
FIG. 11 is a flowchart of a detailed process performed in step SP14.

FIG. 11 is a flowchart of the detailed operation performed in the recommendation display process (step SP14). In step SP14, the determination result obtained in step SP11 is shown on the rear monitor 12.

Referring to FIG. 11, if it is determined that the optimum AF method is the phase-difference AF method, a message indicating that the optimum AF method is the "contrast AF method" is shown on the rear monitor 12 (steps SP61 and SP64).

If it is determined that the optimum AF method is the contrast AF method, a message indicating that the optimum AF method is the "contrast AF method" is shown on the rear monitor 12 (steps SP62 and SP65).

If it is determined that the optimum AF method is the combined method in which both the phase-difference AF method and the contrast AF method are used, a message indicating that the optimum AF method is the "combined (phase-difference AF+contrast AF) method" is shown on the rear monitor 12 (steps SP63 and SP66).

Figure 14:
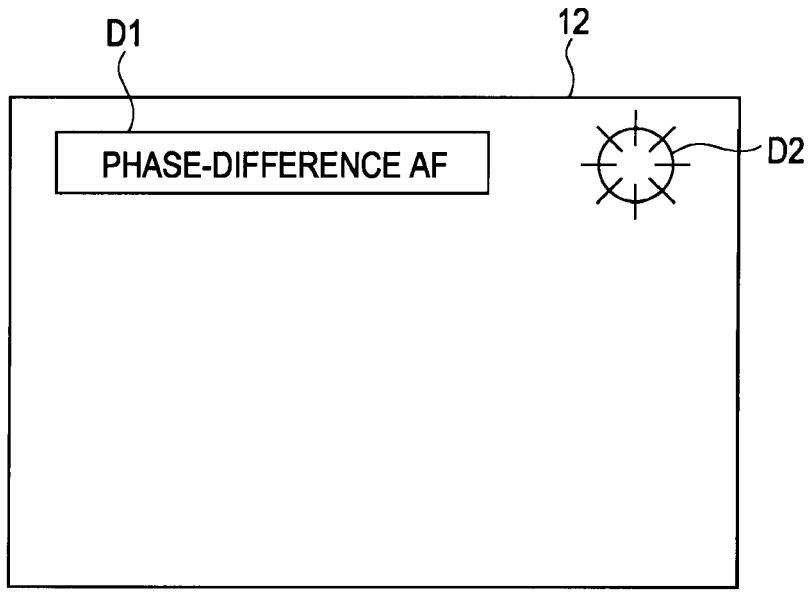
FIG. 14 shows a display screen including a recommendation display and a warning display.

FIG. 14 shows an example of the "recommendation display". Referring to FIG. 14, the character string "phase-difference AF" is shown in a display field D1 near the top edge of the rear monitor 12, which means that the recommended AF method is the "phase-difference AF method". If the live view display is presented, the character string "phase-difference AF" may be superimposed on the live view images. If the composition determination is performed using the optical finder, various image-capturing information can be presented in areas outside the display field D1.

If an AF method other than the phase-difference AF method is recommended, the name of the recommended AF method is shown in the display field D1.

Figure 15:
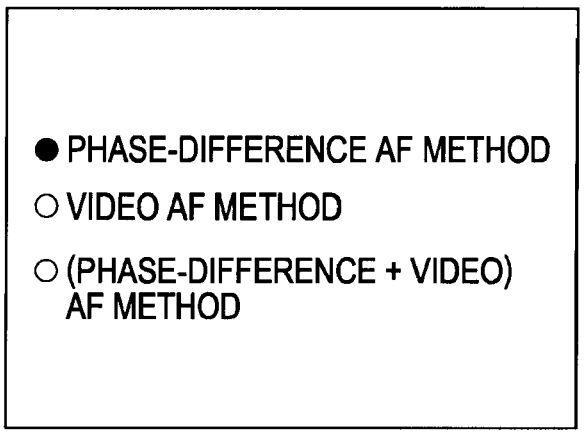
FIG. 15 shows a modification of the recommendation display.
Figure 16:
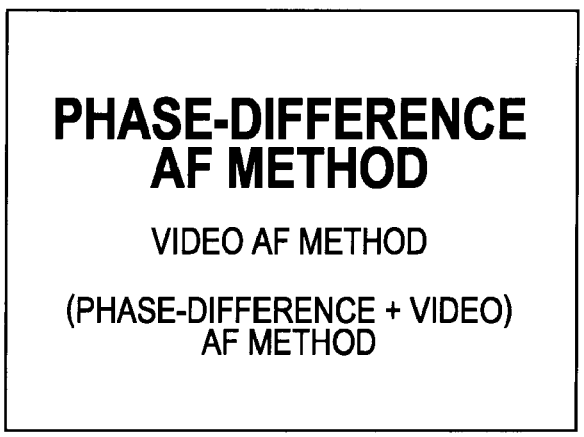
FIG. 16 shows another modification of the recommendation display.

The manner in which the "recommendation display" is presented is not limited to that described above. For example, as shown in FIG. 15, the names of all of the three AF methods may be displayed and the selected AF method can be indicated by placing a check mark (for example, red circle) in one of check fields provided on the left of the names of the AF methods. Alternatively, as shown in FIG. 16, the names of all of the three AF methods may be displayed and the selected AF method can be indicated by showing the name of the selected AF method with the largest characters.

If the recommendation display is provided as described above, the operator can check the optimum AF method for the current conditions under which the object image is captured. Therefore, the operator can switch the AF method to the optimum AF method.

For example, in the case in which the phase-difference AF mode MD1 or the contrast AF mode MD2 is selected, the optimum AF method determined by the determiner 123 can be indicated on the recommendation display, thereby prompting the operator to switch the AF mode. When the phase-difference AF mode MD1 or the contrast AF mode MD2 is being selected, there may be a more suitable AF method than the AF method corresponding to the currently selected AF mode. In such a case, the operator can perform a switching operation to select the mode in which the optimum AF method is continuously used.

In addition, also when the automatic switching mode MD3 is selected, the operator can be informed of the optimum AF for use in the AF operation. Therefore, the operator can switch to the phase-difference AF mode MD1 or the contrast AF mode MD2 as necessary.

Warning Display

In step SP15, it is determined whether or not the warning display setting is set to ON. If the warning display setting is set to ON, the warning display is presented in step SP16. If the warning display setting is set to OFF, the process proceeds to step SP17 without presenting the warning display. In step SP16, the warning operation is performed only when the automatic switching mode MD3 is selected. If one of the other modes MD1 and MD2 is selected, the warning operation is not performed.

In the imaging apparatus 1A, whether to use the live view display or the optical finder mainly in the composition determination operation in the automatic switching mode MD3 can be set by another setting operation. In the following description, it is assumed that one of the composition determination operations is selected by the setting operation performed by the operator.

In the imaging apparatus 1A, when the live view display is to be performed, the main mirror 61 and the sub mirror 62 of the mirror mechanism 6 are removed from the optical path, as shown in FIG. 5, so that light from the object can reach the imaging device 5. On the other hand, although the AF module 20 can detect the phase difference signal in the state shown in FIG. 4, it is difficult to perform the phase-difference detection signal in the state shown in FIG. 5. Therefore, in the imaging apparatus 1A, it is difficult to simultaneously perform the live view display operation and the AF operation using the phase-difference AF method. Here, a case in which the phase-difference AF method is determined as the optimum AF method in step SP11 while the automatic switching mode MD3 is set in the imaging apparatus 1A will be considered. In this case, if the release button 11 is pressed halfway while the live view display is being presented and the AF operation is started accordingly, the state in which the live view display is presented (FIG. 5) is changed into the state in which the phase-difference AF method can be executed (FIG. 4). Therefore, the live view display is stopped.

Accordingly, the imaging apparatus 1A issues a warning when the live view display is being presented (FIG. 5), when the automatic switching mode MD3 is set, and when the phase-difference AF method is determined to be the optimum AF method in step SP11. The warning indicates that the AF method will be switched to the phase-difference AF method, that is, that the live view display will be stopped. Due to this warning, the operator can expect that the live view display will be stopped when the release button 11 is pressed halfway and the AF operation is started. Therefore, the operator can be prevented from being surprised when the live view display suddenly stops.

In addition, in the imaging apparatus 1A, it is difficult to view the object image through the finder window 10 when the main mirror 61 is removed from the optical path as shown in FIG. 5. In the composition determination operation using the optical finder, the main mirror 61 and the sub mirror 62 of the mirror mechanism 6 are placed on the optical path so as to allow the light from the object to reach the finder window 10 through the pentamirror 65, as shown in FIG. 4. On the other hand, although the imaging device 5 can capture the object image in the state shown in FIG. 5, it is difficult for the imaging device 5 to capture the object image in the state shown in FIG. 4 because light from the object does not reach the imaging device 5. Therefore, in the imaging apparatus 1A, it is difficult to simultaneously perform the composition determination operation using the optical finder and the AF operation using the contrast AF method. Here, a case in which the contrast AF method is determined as the optimum AF method in step SP11 while the automatic switching mode M3 is set in the imaging apparatus 1A will be considered. In this case, if the release button 11 is pressed halfway while the composition determination operation using the optical finder is being performed and the AF operation is started accordingly, the state in which the composition determination operation using the optical finder is performed (FIG. 4) is changed into the state in which the contrast AF can be performed (FIG. 5). Therefore, the composition determination operation using the optical finder is stopped.

Accordingly, the imaging apparatus 1A issues a warning when the composition determination operation using the optical finder is being performed (FIG. 4), when the automatic switching mode MD3 is set, and when the contrast AF method is determined to be the optimum AF method in step SP11. The warning indicates that the AF method will be switched to the contrast AF method, that is, that the composition determination operation using the optical finder will be stopped. Due to this warning, the operator can expect that the composition determination operation using the optical finder will be stopped when the release button 11 is pressed halfway and the AF operation is started. Therefore, the operator can be prevented from being surprised when the composition determination operation using the optical finder is suddenly stopped.

FIG. 14 shows an example of the warning display. Referring to FIG. 14, a circular warning field D2 indicating a point light source is provided on the right of the display field D1. The warning display can be presented by turning on (or flashing) the point light source indicated in the warning field D2.

When the composition determination operation using the optical finder is being performed as shown in FIG. 4, it is difficult for the operator to visually check the rear monitor 12. Therefore, another warning display that can be visually checked through the finder window 10 is preferably provided. For example, a warning display lamp or the like may be provided in a region surrounding the object-image visual field presented by the optical finder. Alternatively, an audible warning can be issued instead of the warning display.

In the imaging apparatus 1A, when the automatic focusing operation (AF operation) is performed using both the phase-difference AF method and the contrast AF method, the state shown in FIG. 4 and the state shown in FIG. 5 are successively established. Therefore, there is a period in which only one of the composition determination operations can be performed irrespective of whether the state shown in FIG. 4 or the state shown in FIG. 5 is currently set. Therefore, in the present embodiment, the above-described warning is also issued when the combined method is determined as the optimum AF method.

AF Driving Operation and Image-Capturing Operation

When it is determined that the state of the release button 11 is changed to the half-pressed state S1 in step SP17, the AF driving operation in which the imaging lens is actually driven is performed in step SP18.

The AF driving operation is performed using the AF method that is selected as the AF method to be actually used in step SP12. For example, if the phase-difference AF method is selected in step SP12, the phase-difference AF method is used in the AF driving operation performed in step SP18 (see FIG. 4). If the contrast AF method is selected in step SP12, the contrast AF method is used in the AF driving operation performed in step SP18 (see FIG. 5). If the combined method is selected in step SP12, the combined method is used in the AF driving operation performed in step SP18.

Thus, the AF driving operation in which the focusing lens is driven is performed using the optimum AF method in accordance with the conditions under which the object image is captured. Accordingly, the AF method can be adequately switched.

Then, unless it is determined that state of the release button 11 is changed to the fully pressed state S2 in step SP19, the process returns to step SP11 and steps SP11 to SP18 are repeatedly performed. If it is determined that the state of the release button 11 is changed to the fully pressed state S2 in step SP19, the process proceeds to step SP20, where a main image-capturing operation in which the exposure operation is performed is performed in the state shown in FIG. 5.

1-5. Determination Process

Branch Process According to AF Method

Figure 7:
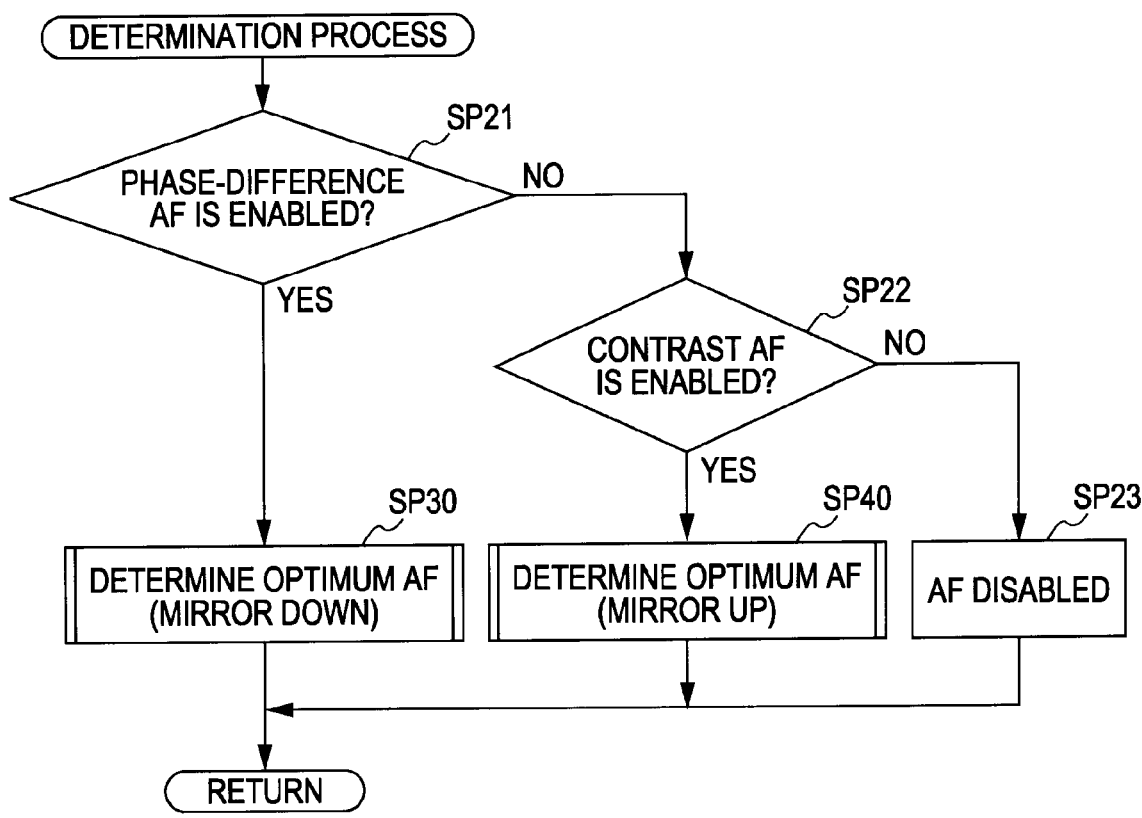
FIG. 7 is a flowchart of a detailed process performed in step SP11.

Next, the determination process performed in step SP11 will be described with reference to the flowchart shown in FIG. 7. The determination process is performed to determine the optimum AF method in accordance with the conditions under which the object image is captured. As described above, the determination result obtained in the determination process is used in the recommendation display operation (step SP14), the warning operation (step SP16), and the AF driving operation (step SP18).

First, in steps SP21 and SP22, it is determined whether or not the phase-difference AF method is enabled and whether or not the contrast AF method is enabled, respectively.

As described above, in the imaging apparatus 1A, whether to use the optical finder or the live view display mainly in the composition determination operation is set by the setting operation performed by the operator. Until the state of the release button 11 is changed to the half-pressed state S1, the composition determination operation using the optical finder or the live view display is performed according to the setting.

If the setting is made such that the composition determination operation is to be performed using the optical finder, the process of determining the in-focus lens position can be performed by the phase-difference detection method using the AF module 20, as shown in FIG. 4. To put it shortly, the phase-difference AF method can be executed. However, in the state shown in FIG. 4 (mirror-down state), it is difficult to cause the light from the object to be incident on the imaging device 5. Therefore, it is difficult to perform the process of determining the in-focus lens position by the contrast method using the object light incident on the imaging device 5. To put it shortly, it is difficult to perform the contrast AF.

If the setting is made such that the composition determination operation is to be performed using the live view display, the process of determining the in-focus lens position by the contrast method using the object light incident on the imaging device 5 can be performed, as shown in FIG. 5. To put it shortly, the contrast AF method can be executed. However, in the state shown in FIG. 5 (mirror-up state), it is difficult to cause the light from the object to be incident on the AF module 20. Therefore, it is difficult to perform the process of determining the in-focus lens position by the phase-difference detection method using the AF module 20. To put it shortly, it is difficult to perform the phase-difference AF method.

When the imaging apparatus 1A is in the state shown in FIG. 4 (when, for example, the setting is made such that the composition determination operation is to be performed using the optical finder), it is determined that the phase-difference AF method can be executed in step SP21. Then, the process proceeds to step SP30.

When the imaging apparatus 1A is in the state shown in FIG. 5 (when, for example, the setting is made such that the composition determination operation is to be performed using the live view display), it is determined that the contrast AF can be performed in step SP22. Then, the process proceeds to step SP40.

While the state is being changed between the state shown in FIG. 4 and the state shown in FIG. 5, there is a period in which neither the phase-difference AF method nor the contrast AF method can be executed, although such a period is extremely short. In this period, it is determined that "AF is disabled" in step SP23 and an exception handling process is performed. For example, if it is determined that "AF is disabled", neither the recommendation display nor the warning display is presented in the following steps.

In the imaging apparatus 1A, if the state of the release button 11 is changed to the half-pressed state S1 while the automatic switching mode MD3 is being selected, the AF method determined in step SP12 is used. When the phase-difference AF method is used, the imaging apparatus 1A is set to the state shown in FIG. 4. When the contrast AF is used, the imaging apparatus 1A is set to the state shown in FIG. 5. Then, the AF driving operation is performed. Therefore, while the release button 11 is in the half-pressed state S1, it is determined whether the process is to proceed to step SP30 or step SP40 in accordance with the AF method determined in step SP12.

When the half-pressed state S1 of the release button 11 is canceled, the composition determination operation corresponding to the setting made by the operator is restarted. Then, it is determined whether the process is to proceed to step SP30 or step SP40 in accordance with whether the imaging apparatus 1A is the state shown in FIG. 4 or the state shown in FIG. 5.

Step SP30

Figure 8:
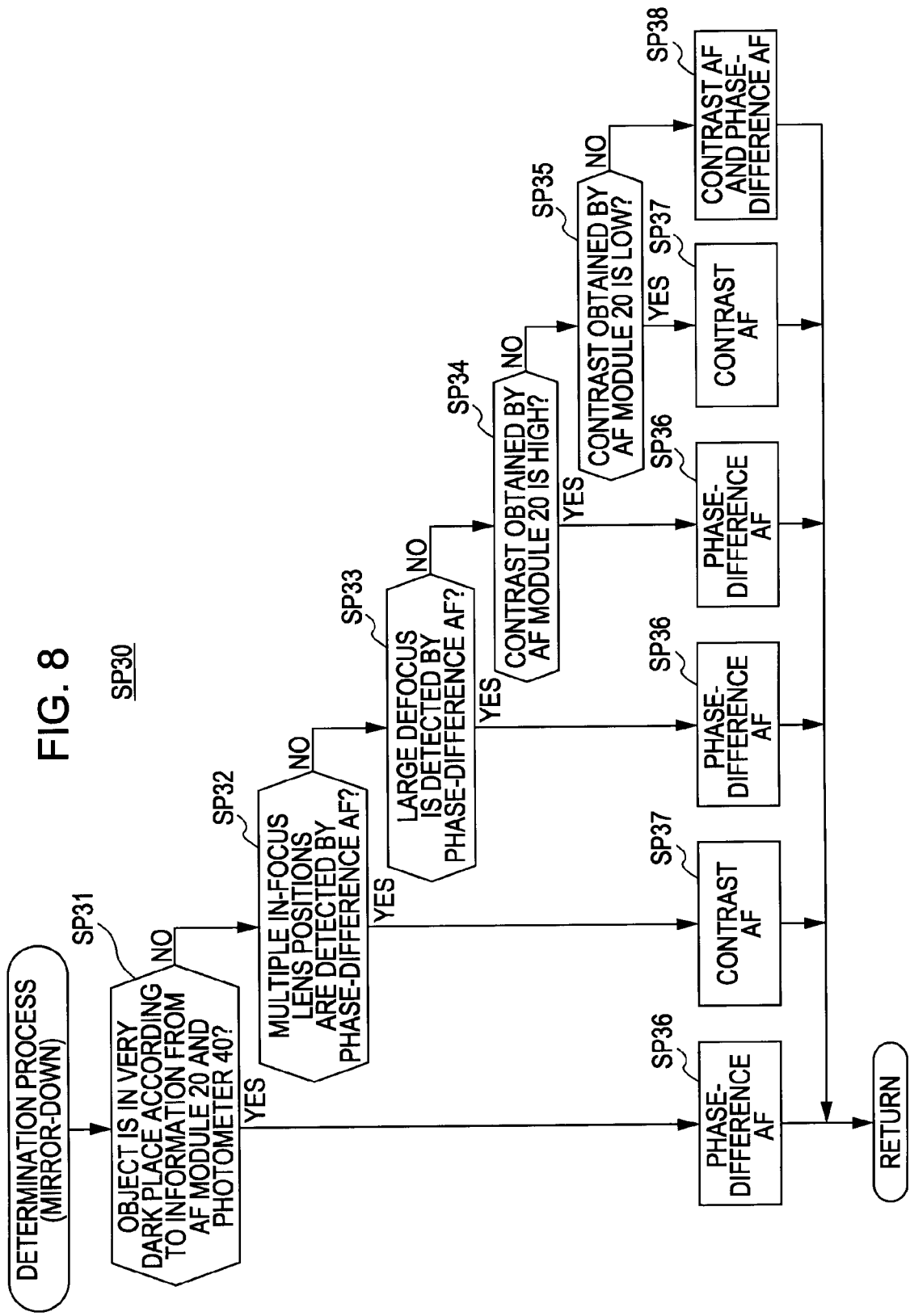
FIG. 8 is a flowchart of a detailed process performed in step SP30.

Next, the detailed operation performed in step SP30 will be described below with reference to FIG. 8.

Step SP30 is executed when the imaging apparatus 1A is in the state shown in FIG. 4. The determiner 123 checks the image-capturing conditions under which the object image is captured on the basis of the detection information obtained by the sensors (the AF module 20 and the photometer 40) that can be used in the current state. Then, the determiner 123 determines the optimum AF method for the image-capturing conditions.

In step SP31, it is determined whether or not a condition C1 is satisfied. The condition C1 is satisfied when an amount of light received by the AF module 20 is smaller than a predetermined threshold TH1 and an amount of light received by the photometer 40 is smaller than a predetermined threshold TH2. If the condition C1 is satisfied, it is determined that the object is in a dark place and the process proceeds to step SP36, where the phase-difference AF method is determined as the optimum AF method. Thus, when the object is in a dark place, the phase-difference AF method, which is advantageous for applications in which the amount of light is small, can be determined as the optimum AF method. In particular, if the AF module 20 and the photometer 40 receive light from different portions of the object, the determination is performed on the basis of brightnesses at the different portions of the object. Accordingly, it can be more accurately determined whether or not the focusing operation using the contrast AF method is difficult due to insufficient brightness. If the condition C1 is not satisfied, the process proceeds to step SP32.

In step SP32, it is determined whether or not a condition C2 is satisfied. The condition C2 is satisfied when there are a plurality of in-focus lens positions detected on the basis of the phase-difference detection signal obtained by the AF module 20. Because of the principle of the phase-difference AF method, if the object has a grid-shaped object, it is difficult to adequately determine the in-focus lens position due to the influence of adjacent portions of the grid-shaped object. As a result, a plurality of in-focus lens positions are detected. Therefore, if the condition C2 is satisfied, it is determined that such a situation has occurred and the process proceeds to step SP37. In step SP37, the contrast AF method is determined as the optimum AF method. If the contrast AF method is used, the in-focus lens position can be more accurately determined than the case in which the phase-difference AF method is used. Accordingly, the contrast AF is determined as the optimum AF method in the case in which a gray-scale value of the object periodically changes with a high frequency (spatial frequency), for example, in the case in which the object has a grid-like shape. If the condition C2 is not satisfied, the process proceeds to step SP33.

In step SP33, it is determined whether or not a condition C3 is satisfied. The condition C3 is satisfied when an amount of defocus DF is larger than a predetermined threshold TH3. The amount of defocus DF is calculated as a difference (displacement) between a lens position determined as the in-focus lens position by the phase-difference AF method using the AF module 20 and a current lens position of the imaging lens. It is determined whether or not the thus-determined amount of defocus DF is larger than the predetermined threshold TH3. If the condition C3 is satisfied, the image-capturing condition that the amount of defocus DF is relatively large is taken into account, and the process proceeds to step SP36, where the phase-difference AF method, which provides relatively high AF speed, is determined as the optimum AF method. Accordingly, the phase-difference AF method, which provides relatively high AF speed, can be determined as the optimum AF method when the object is relatively largely out of focus and the lens position is to be moved by a relatively long distance to the in-focus position. As a result, the AF operation can be performed at a high speed. If the condition C3 is not satisfied, the process proceeds to step SP34.

In step SP34, it is determined whether or not a condition C4 is satisfied. The condition C4 is satisfied when the contrast of the object image received by the AF module 20 is higher than a predetermined threshold TH4. If the condition C4 is satisfied, it is determined that the object image obtained by the AF module 20 is relatively clear and that the in-focus lens position can be satisfactorily determined by the phase-difference AF method. Accordingly, the process proceeds to step SP36, where the phase-difference AF method, which provides relatively high AF speed, is determined as the optimum AF method. If the condition C4 is not satisfied, the process proceeds to step SP35.

In step SP35, it is determined whether or not a condition C5 is satisfied. The condition C5 is satisfied when the contrast of the object image received by the AF module 20 is lower than a predetermined threshold TH5 (<TH4). If the condition C5 is satisfied, it is determined that the object image obtained by the AF module 20 is not clear enough to determine the in-focus lens position using the phase-difference AF method.

Accordingly, the process proceeds to step SP37, where the contrast AF method, which provides higher accuracy, is determined as the optimum AF method. If the condition C5 is not satisfied, the process proceeds to step SP38.

The process proceeds to step SP38 when the object image obtained by the AF module 20 is not too unclear to abandon use of the phase-difference AF method, but is not clear enough to perform the in-focus determination using only the phase-difference AF method. In other words, the process proceeds to step SP38 when the object image obtained by the AF module 20 is moderately clear.

Considering the above-described situation, the "combined method" is determined as the optimum AF method in step SP38.

In the case in which the "combined method" is used in the AF driving operation in step SP18, first, the in-focus lens position is determined using the phase-difference AF method and the imaging lens is moved to a position near the determined in-focus lens position. Then, the focusing lens is moved by the contrast AF method.

In more detail, first, the focusing lens is moved to a position near the in-focus lens position determined by the phase-difference AF method in the state shown in FIG. 4. Then, the mirror mechanism 6 is moved to the position shown in FIG. 5. Then, the focusing lens is moved continuously while determining evaluation values for the contrast AF method at different lens positions. The lens position corresponding to the peak of the curve that passes through the evaluation values (peak lens position) is determined as the final in-focus lens position. Then, the focusing lens is moved to the thus-determined peak lens position. Thus, the imaging lens is moved to a position near the in-focus lens position at a high speed using the phase-difference AF method, and then fine adjustment of the lens position is performed using the contrast AF method. As a result, the AF operation can be efficiently performed.

In the case in which the automatic switching mode MD3 is set as the AF mode and the "phase-difference AF method" is determined as the optimum AF method in step SP30 (step SP36), it is not necessary to change the state of the mirror mechanism 6 in the AF driving operation performed in step SP18. Therefore, it is not necessary to change the composition determination method. If the "contrast AF method" or the "combined method" is determined as the optimum AF method in step SP30 (step SP37 or SP38), the state of the mirror mechanism 6 is changed from the state shown in FIG. 4 to the state shown in FIG. 5 in the AF driving operation performed in step SP18. Therefore, the composition determination method is changed. Accordingly, the above-mentioned warning operation is performed so that such a change in the composition determination method can be expected by the operator.

Step SP40

Figure 9:
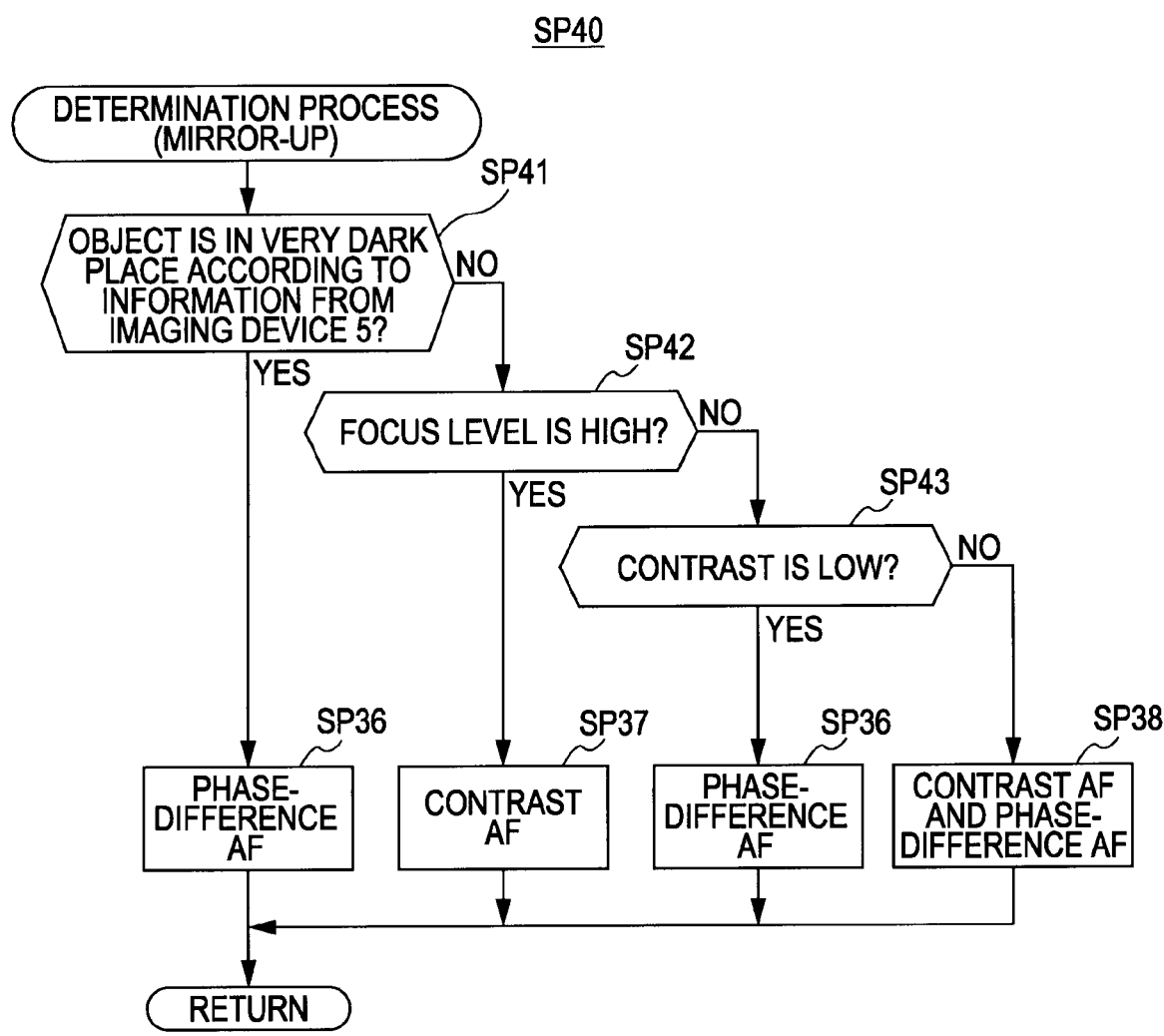
FIG. 9 is a flowchart of a detailed process performed in step SP40.

Next, the detailed operation performed in step SP40 will be described below with reference to FIG. 9.

Step SP40 is executed when the imaging apparatus 1A is in the state shown in FIG. 5. The determiner 123 checks the image-capturing conditions under which the object image is captured on the basis of the detection information obtained by the sensor (the imaging device 5) that can be used in the current state. Then, the determiner 123 determines the optimum AF method for the image-capturing conditions.

In step SP41, it is determined whether or not a condition C6 is satisfied. The condition C6 is satisfied when an amount of light received by the imaging device 5 is smaller than a predetermined threshold TH6. If the condition C6 is satisfied, it is determined that the object is in a dark place and the process proceeds to step SP36, where the phase-difference AF method is determined as the optimum AF method. Thus, when the object is in a dark place, the phase-difference AF method, which is advantageous for applications in which the amount of light is small, can be determined as the optimum AF method. If the condition C6 is not satisfied, the process proceeds to step SP42.

In step SP42, contrast information regarding a single image (object image) captured by the imaging device 5 at a certain time is obtained using two differential filters of different spatial frequencies. Then, the contrast information (high-frequency contrast component) obtained by a high-frequency differential filter FA and contrast information (low-frequency contrast component) obtained by a low-frequency differential filter FB are compared with each other. Then, a focus level of the object is detected on the basis of the result of the comparison, and it is determined whether or not the focus level is higher than a predetermined level. The determination method used in this process will be described below.

If it is determined that the focus level is higher than the predetermined level on the basis of the result of the comparison, it is determined that a condition C7 is satisfied and the process proceeds to step SP37. In step SP37, the contrast AF method is determined as the optimum AF method. When the contrast AF method is used, the imaging lens can be more accurately moved to the in-focus lens position.

If the condition C7 is not satisfied, the process proceeds to step SP43, and the phase-difference AF method is basically used. Thus, if the focus level is lower than the predetermined level, the phase-difference AF method, which provides a relatively high AF speed, is basically determined as the optimum AF method.

In step SP43, it is determined whether or not a condition C8 is satisfied. The condition C8 is satisfied when the contrast of the object image received by the imaging device 5 is lower than a predetermined threshold TH8.

If neither of the conditions C7 and C8 is satisfied, the process proceeds to step SP38, where the combined method using not only the phase-difference AF method but also the contrast AF method is determined as the optimum AF method.

In the case in which the condition C7 is not satisfied but the condition C8 is satisfied, it is determined that the object image obtained by the imaging device 5 is not clear enough to determine the in-focus lens position by the contrast AF method using the image captured by the imaging device 5. Therefore, the process proceeds to step SP36, and the phase-difference AF method is determined as the optimum AF method.

In the case in which the automatic switching mode MD3 is set as the AF mode and the "contrast AF method" is determined as the optimum AF method in step SP40 (step SP37), it is not necessary to change the state of the mirror mechanism 6 in the AF driving operation performed in step SP18. Therefore, it is not necessary to change the composition determination method. If the "phase-difference AF method" or the "combined method" is determined as the optimum AF method in step SP40 (step SP36 or SP38), the state of the mirror mechanism 6 is changed from the state shown in FIG. 5 to the state shown in FIG. 4 in the AF driving operation performed in step SP18. Therefore, the composition determination method is changed. Accordingly, the above-mentioned warning operation is performed so that such a change in the composition determination method can be expected by the operator.

In-Focus Determination Operation Based on Different Kinds of Contrast Information A method for determining a focus level using two kinds of contrast information (low-frequency component and high-frequency component) obtained from a single image (step SP42) will now be described.

Figure 17:
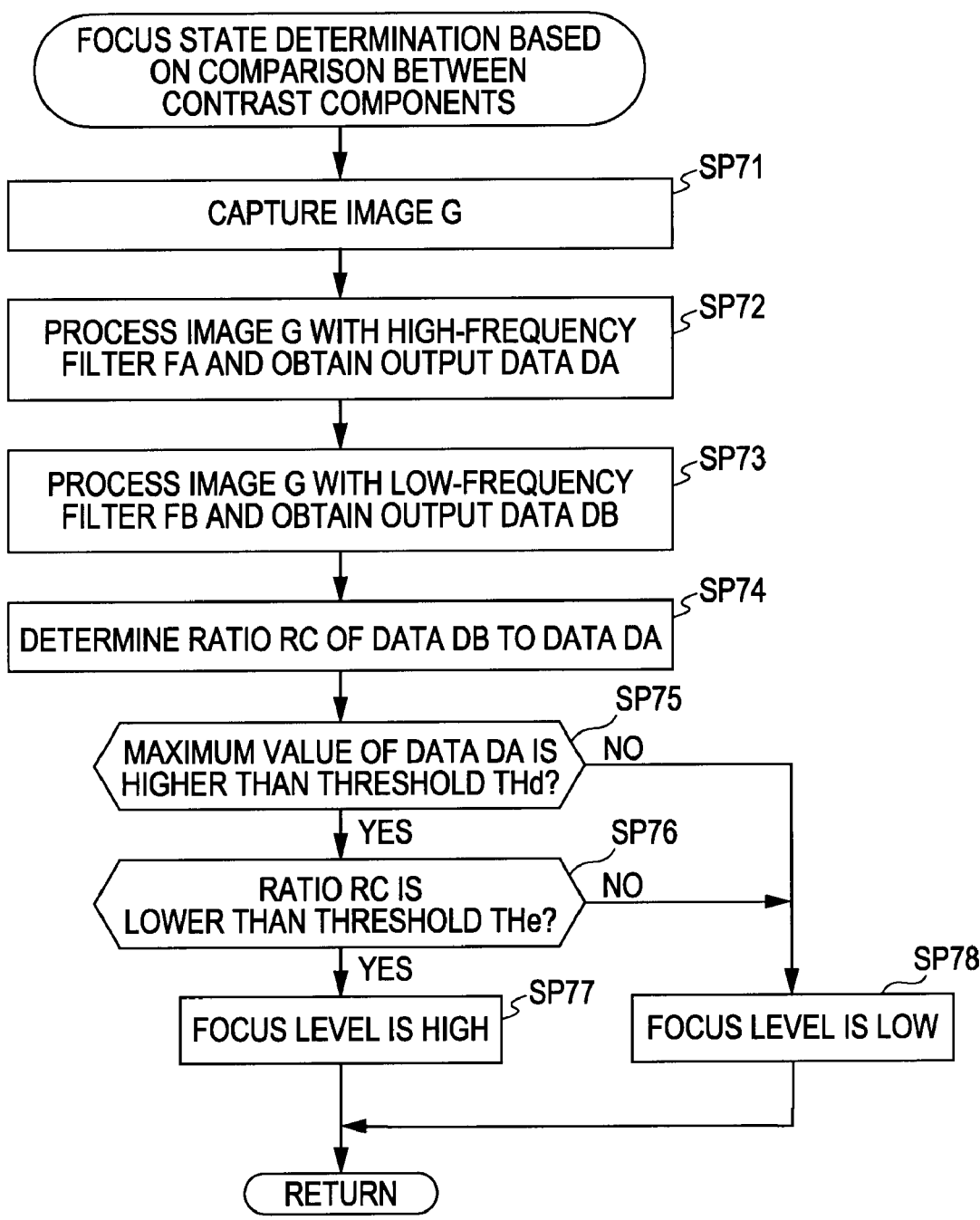
FIG. 17 is a flowchart of an operation for determining a focus level on the basis of a contrast of a single image.
Figure 19:
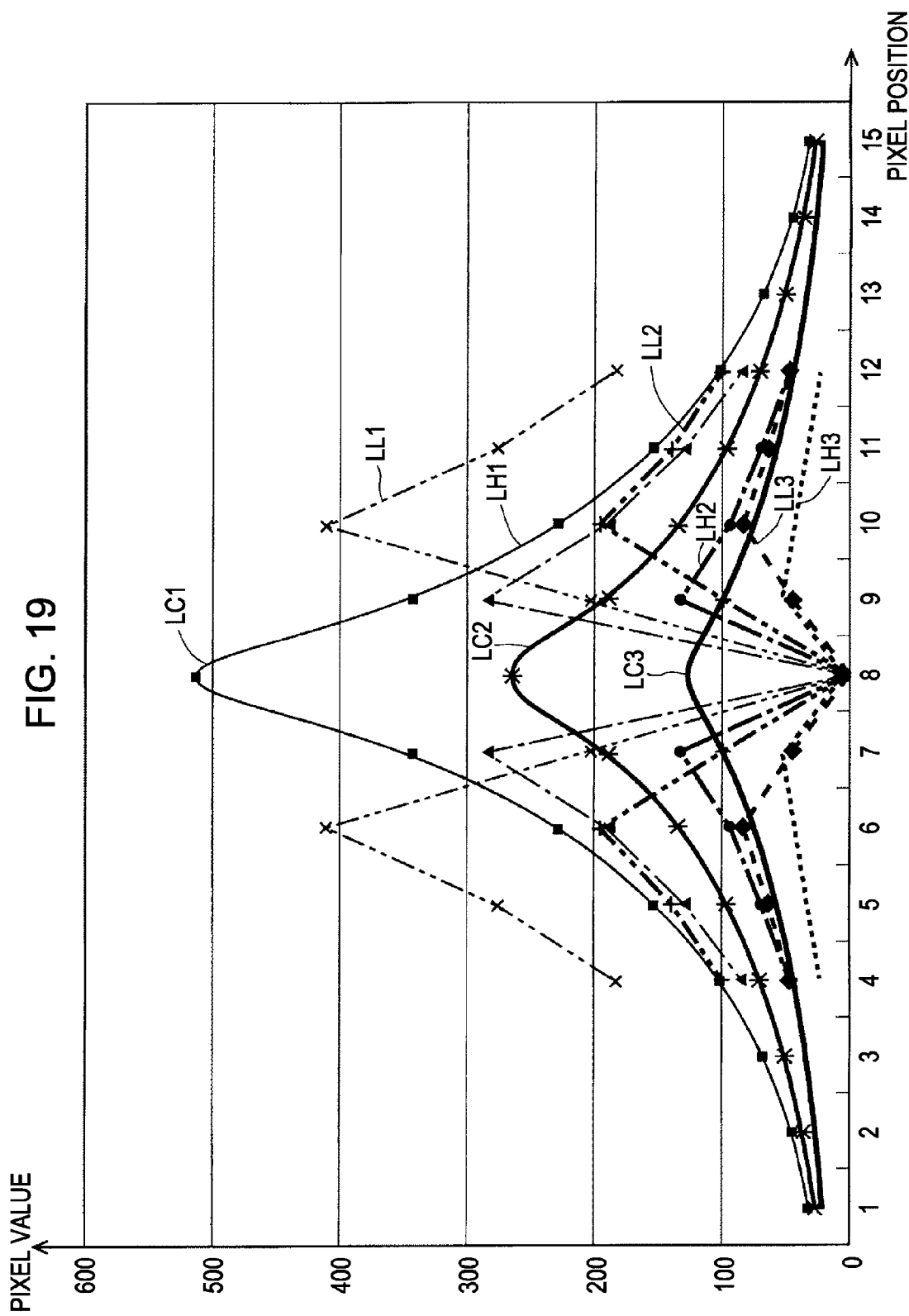
FIG. 19 is a graph of the numerical examples shown in FIG. 18.
Figure 20:
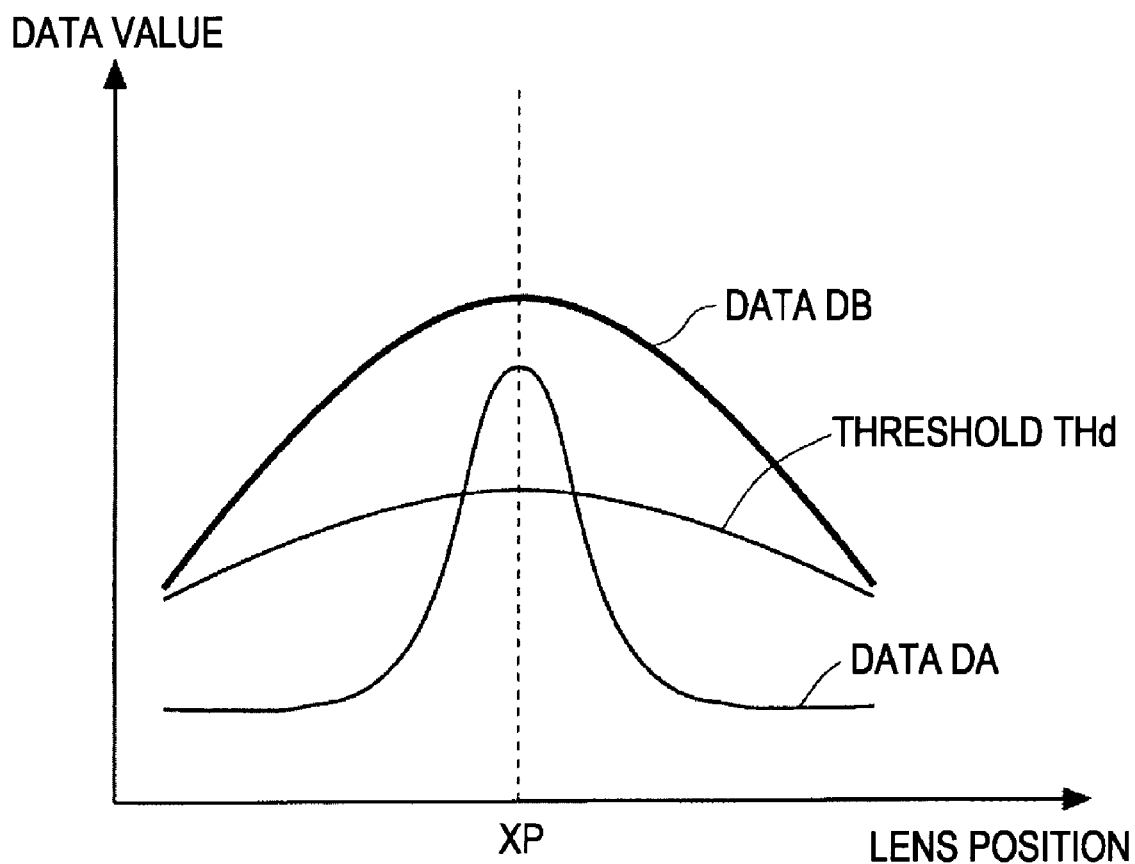
FIG. 20 is a diagram illustrating the relationship between a high-frequency contrast component and a low-frequency contrast component in accordance with the focus level.

FIG. 17 is a flowchart of a detailed operation performed by executing the determination method in step SP70. FIG. 18 is a table illustrating numerical examples, and FIG. 19 is a graph corresponding to the numerical examples shown in FIG. 18. FIG. 20 is a diagram illustrating the relationship between the high-frequency contrast component and the low-frequency contrast component in accordance with the focus level.

Referring to FIG. 17, an image G is captured in step SP71. Then, the captured image G is subjected to a filtering process using a differential filter FA with a relatively high frequency (also called a high-frequency filter) to acquire data DA in step SP72. In addition, the captured image G is also subjected to a filtering process using a differential filter FB with a relatively low frequency (also called a low-frequency filter) to acquire data DB in step SP73. Then, a ratio RC of a maximum value in data DB to a maximum value in data DA is determined in step SP74.

If the ratio RC is smaller than a threshold THe and a representative value (for example, maximum value) of data DA is larger than a threshold THd, it is determined that the focus level is higher than the predetermined level, in other words, the object is nearly focused (steps SP75, SP76, and SP77). In other cases, it is determined that the focus level is lower than the predetermined level, in other words, the object is not in focus (step SP78).

FIG. 18 shows numerical examples representing the states of images obtained at three lens positions. Here, a one-dimensional pixel array is shown for simplicity.

Referring to FIG. 18, the leftmost column block L1 shows numerical values corresponding to the "in-focus state". The central column block L2 shows numerical values corresponding to the "slightly out-of-focus state" in which the object is slightly out of focus. The rightmost column block L3 shows numerical values corresponding to the "out-of-focus state" in which the object is further out of focus.

The left column in the column block L1 includes pixel values (gray-scale values) 30, 45, 68, . . . , 38 for pixels at the first to fifteenth pixel positions. The pixel values of the pixel array in the in-focus state are plotted as a curve LC1 in the graph shown in FIG. 19. Data DA is obtained by subjecting the pixel values of the pixel array to the filtering process using the high-frequency filter FA (1, 0, −1). The thus-obtained data DA is shown in the middle column in the column block L1 in FIG. 18, and is plotted as a curve LH1 in FIG. 19. Data DB is obtained by subjecting the pixel values of the pixel array corresponding to the curve LC1 to the filtering process using the low-frequency filter FB (1, 0, 0, 0, −1). The thus-obtained data DB is shown in the right column in the column block L1 in FIG. 18, and is plotted as a curve LL1 in FIG. 19. In FIG. 18, the ratio RC (1.44) of the maximum value (411) of the data DB to the maximum value (285) of the data DA in the in-focus state is shown in the second row from the bottom in the column block L1.

Similarly, the left column in the column block L2 includes pixel values (gray-scale values) for pixels at the first to fifteenth pixel positions. The pixel values of the pixel array in the "slightly out-of-focus state" are plotted as a curve LC2 in the graph shown in FIG. 19. Data DA obtained by subjecting the pixel values of the pixel array to the filtering process using the high-frequency filter FA is shown in the middle column in the column block L2 in FIG. 18, and is plotted as a curve LH2 in FIG. 19. Data DB obtained by subjecting the pixel values of the pixel array corresponding to the curve LC2 to the filtering process using the low-frequency filter FB is shown in the right column in the column block L2 in FIG. 18, and is plotted as a curve LL2 in FIG. 19. In FIG. 18, the ratio RC (1.51) of the maximum value (195) of the data DB to the maximum value (129) of the data DA in the "slightly out-of-focus state" is shown in the second row from the bottom in the column block L2.

Similarly, the left column in the column block L3 includes pixel values (gray-scale values) for pixels at the first to fifteenth pixel positions. The pixel values of the pixel array in the "out-of-focus state" are plotted as a curve LC3 in the graph shown in FIG. 19. Data DA obtained by subjecting the pixel values of the pixel array to the filtering process using the high-frequency filter FA is shown in the middle column in the column block L3 in FIG. 18, and is plotted as a curve LH3 in FIG. 19. Data DB obtained by subjecting the pixel values of the pixel array corresponding to the curve LC3 to the filtering process using the low-frequency filter FB is shown in the right column in the column block L3 in FIG. 18, and is plotted as a curve LL3 in FIG. 19. In FIG. 18, the ratio RC (1.60) of the maximum value (82) of the data DB to the maximum value (51) of the data DA in the "out-of-focus state" is shown in the second row from the bottom in the column block L3.

FIG. 20 is a diagram illustrating the manner in which the data DA and DB vary in accordance with the lens position. Referring to FIG. 20, when the lens position is near the in-focus lens position XP, the data DA and DB are relatively close to each other. As the lens position is moved farther away from the in-focus lens position XP, the difference between the data DA and DB is increased. Therefore, as the lens position is moved farther away from the in-focus lens position XP, the ratio of the low-frequency contrast component to the high-frequency contrast component is increased. For example, when a maximum value is used as a representative value of each of the two frequency contrast components, the ratio RC (=MB/MA) of the maximum value MB of the low-frequency contrast component to the maximum value MA of the high-frequency contrast component is increased as the lens position is moved further away from the in-focus lens position XP. Referring to FIG. 18, the ratio RC is 1.44 in the in-focus state, and is gradually increased to 1.51 and 1.60 as the focus level is reduced.

Using the above-described principle, here, it is determined that the focus level is higher than the predetermined level when the ratio RC is lower than the predetermined threshold THe (for example, 1.50).

In this example, whether or not the representative value (maximum value) of the data DA is larger than the threshold THd is also taken into account. Accordingly, it can also be checked whether the captured image has a relatively high contrast. FIG. 20 shows the case in which the threshold THd is variable. However, a fixed value may also be set as the threshold THd.

In the above-described embodiment, a maximum value is used as the representative value of each of the frequency contrast components. However, the representative value is not limited to this. For example, the sum may also be used as the representative value for each of the frequency contrast components. In FIG. 18, the bottom row shows the ratio of the sum of the data DB to the sum of the data DA obtained in each state. It can also be determined that the in-focus state is obtained when this ratio RD is lower than the predetermined threshold THe (for example, 1.57).

2. Second Embodiment

2-1. Structure

In the first embodiment, the imaging apparatus 1A is not capable of simultaneously executing the phase-difference AF method and the contrast AF method. In contrast, an imaging apparatus 1B according to the second embodiment is capable of simultaneously performing the phase-difference AF method and the contrast AF method. In the following description, differences from the first embodiment will be mainly explained.

Figure 21:
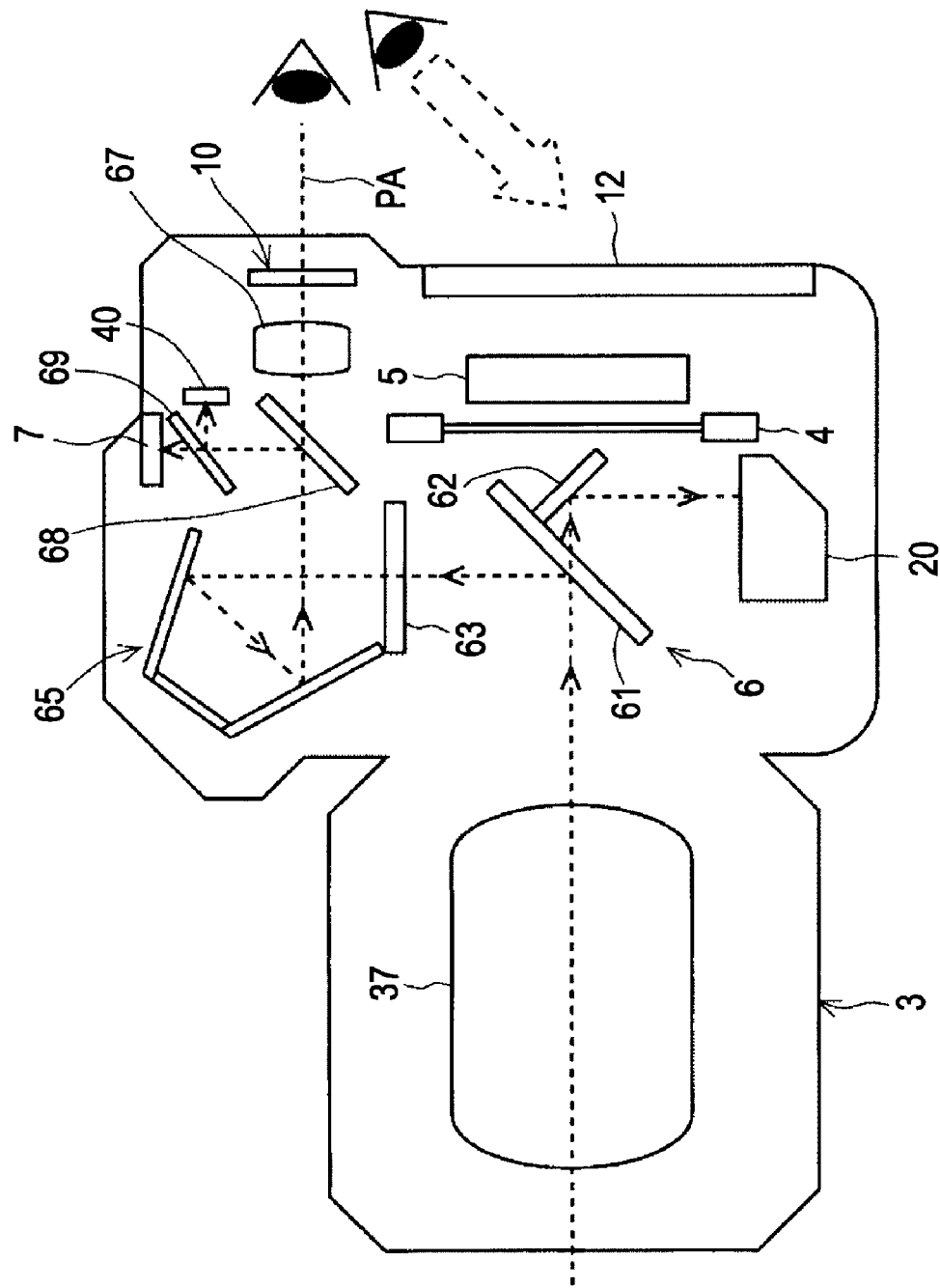
FIG. 21 is a sectional view illustrating the schematic structure of an imaging apparatus according to a second embodiment.
Figure 22:
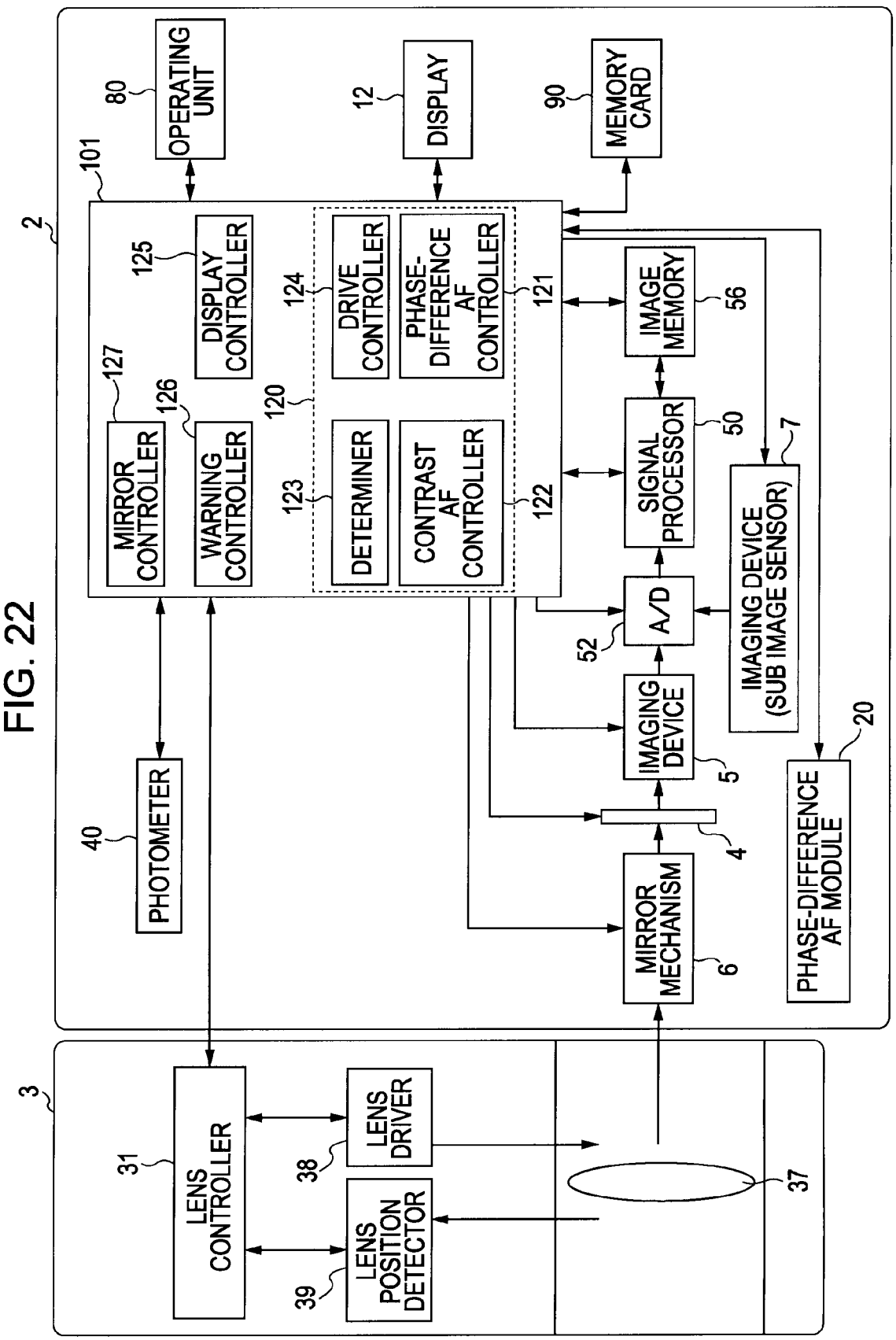
FIG. 22 is a block diagram illustrating the functional structure of the imaging apparatus.

FIG. 21 is a schematic sectional view illustrating the structure of the imaging apparatus 1B according to the second embodiment. FIG. 22 is a block diagram illustrating the functional structure of the imaging apparatus 1B.

Referring to FIGS. 21 and 22, the imaging apparatus 1B additionally includes an imaging device (sub image sensor) 7 in the finder optical system. The imaging device 7 is provided in addition to the imaging device 5, which functions as a main image sensor. The live view display can be presented and the contrast AF method can be executed by using images captured by the imaging device 7.

The imaging apparatus 1B is in the state shown in FIG. 21 until the state of the release button 11 is changed to the fully pressed state S2, that is, while the composition determination operation is being performed. More specifically, similar to the state shown in FIG. 4, the main mirror 61 is placed on the optical path (imaging optical path) extending from the imaging lens unit 3 to the imaging device 5. Light reflected by the main mirror 61 is incident on the pentamirror 65, which changes the direction of the light toward the finder window 10. Thus, the composition determination operation using the optical finder can be performed.

The imaging apparatus 1B further includes an optical element (half mirror) 68 on the optical path extending from the pentamirror 65 to the finder window 10. Light reflected by the main mirror 61 is incident on the pentamirror 65, which changes the direction of the light. Then, the direction of a portion of the light from the pentamirror 65 is changed by the optical element 68 so that this portion of light travels in a direction different from the direction toward the finder window 10 and passes through the optical element (half mirror) 69 toward the imaging device 7. A portion of the light that reaches the optical element 69 is reflected by the optical element 69 and reaches the photometer 40.

The structure of the imaging device 7 is similar to that of the imaging device 5, and is used for, for example, generating an image signal (moving image) for presenting the live view display. However, it is not necessary that the imaging device 7 have the same number of pixels as the imaging device 5, and may have a smaller number of pixels as those in the imaging device 5.

An image signal acquired by the imaging device 7 is subjected to signal processes similar to those performed for the image signal acquired by the imaging device 5. More specifically, the image signal acquired by the imaging device 7 is converted into digital data by the A/D converter circuit 52, subjected to predetermined image processing by the digital signal processor circuit 50, and is stored in the image memory 56.

The images captured in time series and stored in the image memory 56 are successively read from the image memory 56 and are successively displayed on the rear monitor 12. Accordingly, the images can be displayed in a manner of a moving image (live view display). Thus, the operator can perform the composition determination operation using the live view display.

An in-focus lens-position determination operation can be performed by determining evaluation values for contrasts of a plurality of images captured by the imaging device 7 and determining a lens position at which the evaluation value is optimized as the in-focus lens position. Then, the AF driving operation can be performed by moving the focusing lens to the determined in-focus lens position. Thus, the imaging apparatus 1B is capable of performing the contrast AF using the images acquired by the imaging device 7.

Light that passes through the main mirror 61 is reflected downward by the sub mirror 62 and is incident on the AF module 20. The AF module 20 generates a phase-difference detection signal based on light incident thereon. The in-focus lens-position determination operation for determining the in-focus lens position and the AF driving operation for moving the focusing lens to the in-focus lens position can be performed by using the phase-difference detection signal. Thus, the imaging apparatus 1B is capable of executing the phase-difference AF method using the phase-difference detection signal obtained by the AF module 20.

As described above, the composition determination operation using the live view display and the composition determination operation using the optical finder can be performed simultaneously until the state of the release button 11 is changed to the half-pressed state S2. In addition, both the phase-difference AF method and the contrast AF method can be used until the state of the release button 11 is changed to the half-pressed state S2.

When the state of the release button 11 is changed to the fully pressed state S2, the mirror mechanism 6 is set to the mirror-up state, similar to the state shown in FIG. 5, so that the exposure operation can be performed by the imaging device 5. The imaging device 5 performs photoelectric conversion of the object image received at the time when the shutter 4 is opened, and thereby generates an image signal for the object. Thus, the final captured image (captured image data) of the object can be obtained.

2-1. Operation

Figure 23:
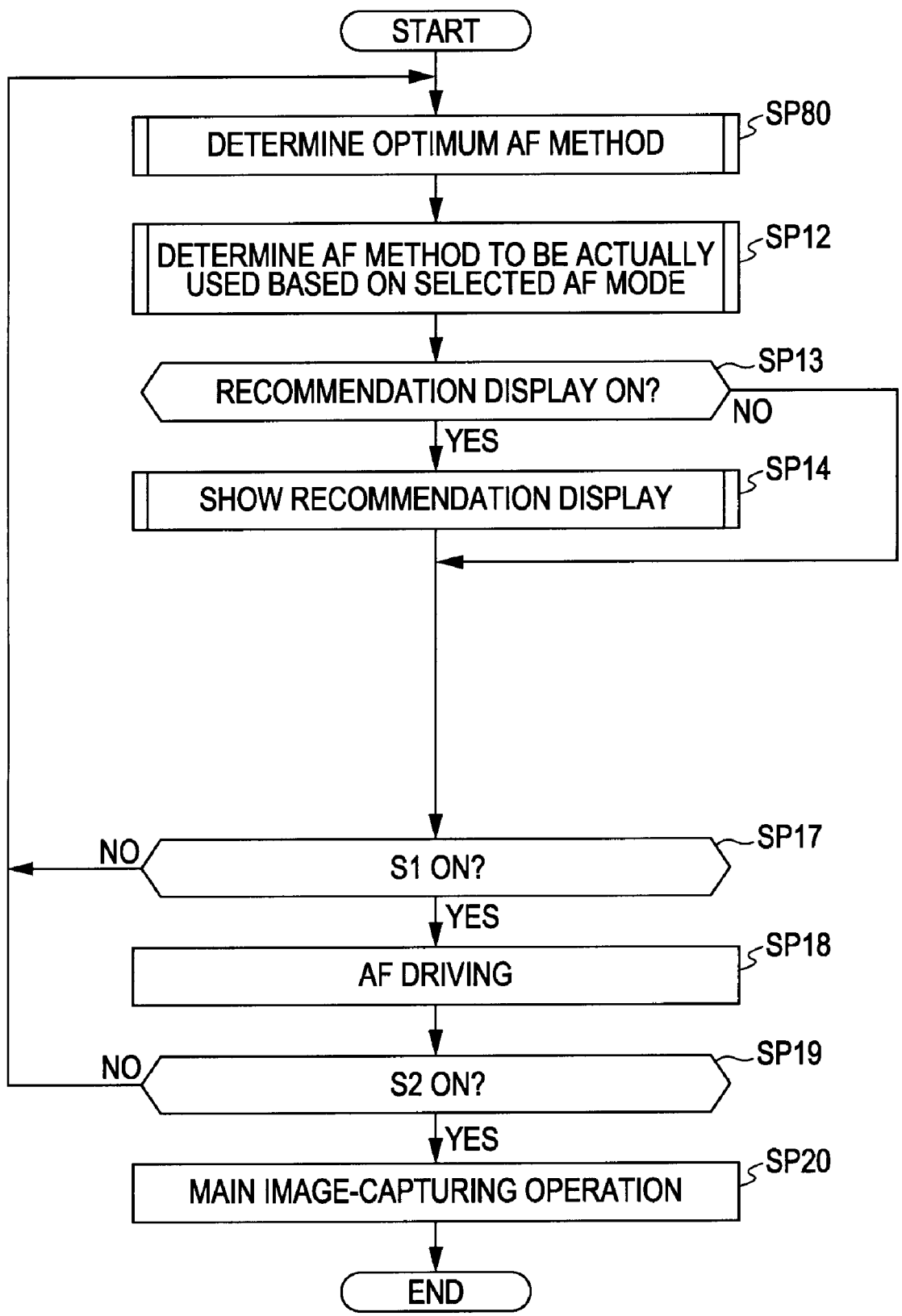
FIG. 23 is a flowchart of the overall operation performed in the imaging apparatus.
Figure 24:
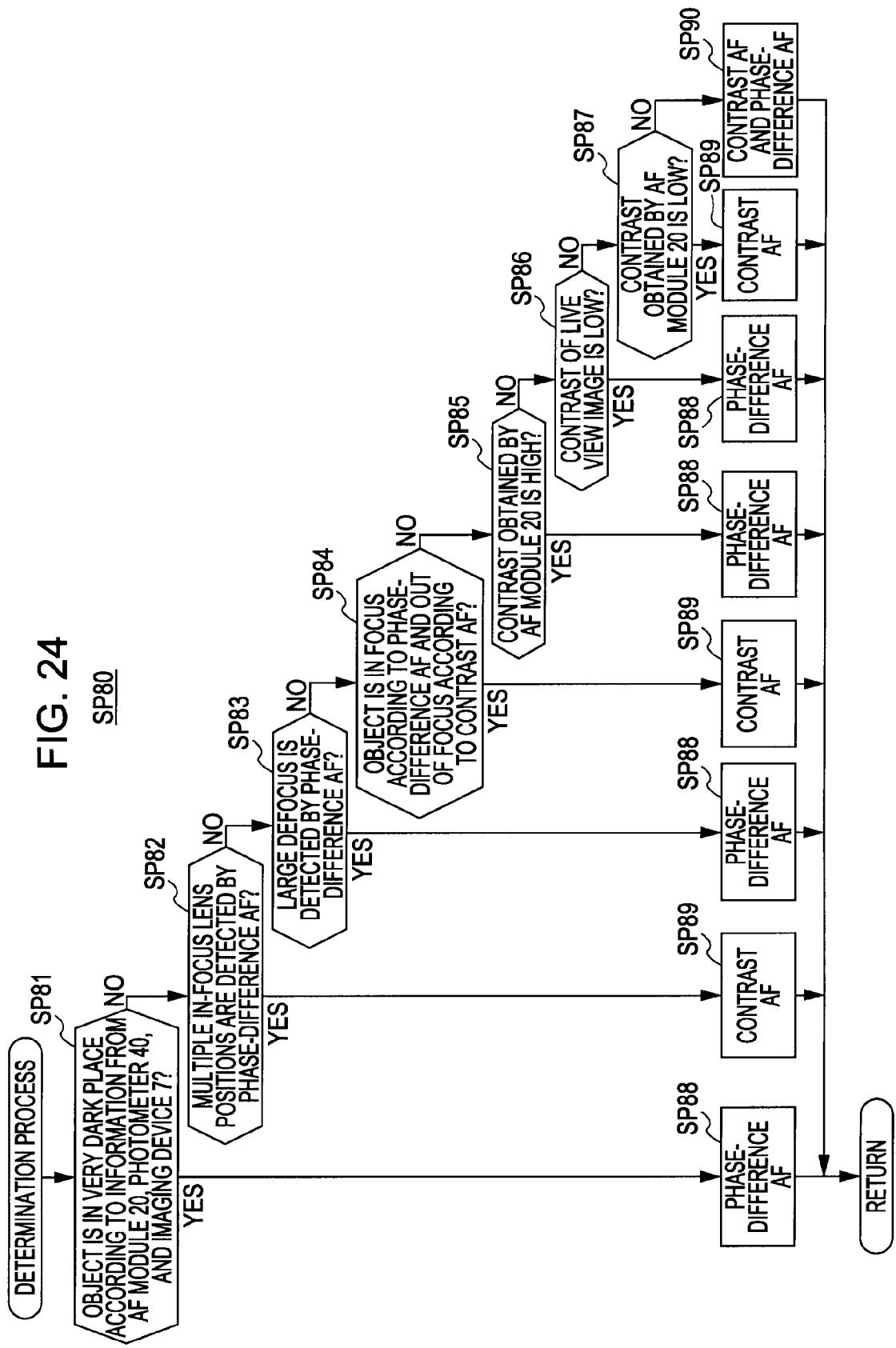
FIG. 24 is a flowchart of a detailed process performed in step SP80.

FIGS. 23 and 24 are flowcharts of operations performed by the imaging apparatus 1B. FIG. 23 is a flowchart of the overall operation, and FIG. 24 is a flowchart of a detailed operation performed in step SP80 in FIG. 23.

The operation of FIG. 23 is similar to the operation of the first embodiment (see FIG. 6) except for the following points. That is, the process of step SP80 is performed instead of the process of step SP11, and the processes of steps SP15 and SP16 are omitted.

Since the imaging apparatus 1B have the above-described structure, it is not necessary to change the composition determination method even when the AF method is changed. Therefore, in the second embodiment, the warning operation (steps SP15 and SP16) is not performed, as shown in FIG. 23.

In the imaging apparatus 1B according to the second embodiment, both the phase-difference detection signal from the AF module 20 and the contrast evaluation values of the images can be used irrespective of which of the two kinds of composition determination methods is used. Accordingly, in the second embodiment, the process of step SP80, which is different from the process of step SP11, is performed for determining the optimum AF method.

The process performed in step SP80 will be described below with reference to FIG. 24. The process of step SP80 is based on the concept that the phase-difference AF method is basically prioritized. In the contrast AF method, the lens is moved over a range including areas on both sides of the in-focus lens position. Therefore, in the operation using the contrast AF method, first, the object image appears very clear, is then somewhat blurred, and then becomes very clear again. In other words, overshooting and returning occurs. This does not occur when the phase-difference AF method is used. Therefore, the phase-difference AF method causes less discomfort to the operator. In addition, the phase-difference AF method provides a higher AF speed than the contrast AF method.

Step SP81 is similar to step SP31, except an amount of light received by the imaging device 7 is taken into account in addition to amounts of light received by the AF module 20 and the photometer 40. More specifically, it is determined whether or not a condition C11 is satisfied. The condition C11 is satisfied if the amount of light received by the AF module 20 is smaller than the predetermined threshold TH1, the amount of light received by the photometer 40 is smaller than the predetermined threshold TH2, and the amount of light received by the imaging device 7 is smaller than a predetermined threshold TH11. If the condition C11 is satisfied, it is determined that the object is in a very dark place and the process proceeds to step SP88, where the phase-difference AF method is determined as the optimum AF method. If the condition C11 is not satisfied, the process proceeds to step SP82.

In step SP82, a process similar to that performed in step SP32 is performed. More specifically, if the condition C2 is satisfied, that is, if there are a plurality of in-focus lens positions detected on the basis of the phase-difference detection signal obtained by the AF module 20, the process proceeds to step SP89, where the contrast AF method is determined as the optimum AF method. If the contrast AF method is used, the in-focus lens position can be more accurately determined than the case in which the phase-difference AF method is used. If the condition C2 is not satisfied, the process proceeds to step SP33.

In step SP83, a process similar to that in performed step SP33 is performed. More specifically, it is determined whether or not the condition C3 is satisfied, that is, whether or not the amount of defocus DF is larger than the predetermined threshold TH3.

If the condition C3 is satisfied, the process proceeds to step SP88, where the phase-difference AF method, which provides a relatively high AF speed, is determined as the optimum AF method. Accordingly, the phase-difference AF method, which provides a relatively high AF speed, can be determined as the optimum AF method when the object is largely out of focus. As a result, the AF operation can be performed at a high speed.

If the condition C3 is not satisfied, the process proceeds to step SP84.

In step SP84, a determination process based on two conditions is performed.

A first condition C12 is satisfied when the amount of defocus DF is smaller than a predetermined threshold TH12 (<TH3). The amount of defocus DF is calculated as a difference (displacement) between a lens position determined as the in-focus lens position by the phase-difference AF method using the AF module 20 and a current lens position of the imaging lens. The condition C12 can be considered as a condition for determining whether or not an in-focus state is obtained by the phase-difference AF method. The threshold TH12 may be equal to the threshold TH3.

A second condition C13 is satisfied when the focus level is determined to be lower than a predetermined level on the basis of contrast information obtained by the above-mentioned two kinds of spatial frequency filters FA and FB. The condition C13 can be considered as a condition for determining whether or not an in-focus state is obtained on the basis of different kinds of contrast information (two kinds of contrast information in this case).

In step SP84, it is determined whether or not a condition C14 is satisfied. The condition C14 is satisfied if both of the conditions C12 and C13 are satisfied. If the condition C14 is satisfied, the process proceeds to step SP89, where the contrast AF method is determined as the optimum AF method. When the condition C14 is satisfied, the amount of defocus DF based on the result of phase difference detection performed by the AF module 20 is smaller than the threshold TH12, and the focus level is determined to be smaller than the predetermined level on the basis of the contrast information obtained by the two kinds of spatial frequency filters FA and FB. In other words, it is determined that the in-focus state is obtained by the phase-difference AF method and that the in-focus state is not obtained by the focus-state determination operation based on the different kinds of contrast information.

When the condition C12 is used, the frequency of use of the contrast AF method can be reduced. In other words, the frequency of use of the phase-difference AF method can be increased. For example, when the amount of defocus DF calculated by the phase-difference AF method is larger than the threshold TH12 and it is determined that the in-focus state is not obtained, the phase-difference AF method is basically used in steps SP84 to SP87.

In addition, when the condition C13 is additionally used, the frequency of use of the contrast AF method can be further reduced. If it is determined that the in-focus state is obtained by the focus-state determination operation based on the different kinds of contrast information, the object is within an in-focus area. Therefore, it is not necessary to perform the AF operation using the contrast AF method. Accordingly, instead of using the contrast AF method, the phase-difference AF method is basically used as the optimum AF method. If it is determined that the in-focus state is not obtained by the focus-state determination operation based on the different kinds of contrast information, the focus level can be increased by using the contrast AF method, which is more accurate than the phase-difference AF method.

If the condition C14 is not satisfied, the process proceeds to step SP85.

In step SP85, a process similar to that performed in step SP34 is performed. More specifically, it is determined whether or not the condition C4 is satisfied, that is, whether or not the contrast of the object image received by the AF module 20 is higher than the predetermined threshold TH4. If the condition C4 is satisfied, the process proceeds to step SP88, where the phase-difference AF method is determined as the optimum AF method. If the condition C4 is not satisfied, the process proceeds to step SP86.

In step SP86, a process similar to that performed in step SP43 is performed. More specifically, in step SP86, it is determined whether or not a condition C16 is satisfied. The condition C16 is satisfied when the contrast of the object image received by the imaging device 7 is lower than a predetermined threshold TH16. If the condition C16 is satisfied, it is determined that the object image obtained by the imaging device 7 is not clear enough to determine the in-focus lens position by the contrast AF method using the image obtained by the imaging device 7. Accordingly, the process proceeds to step SP88, where the phase-difference AF method is determined as the optimum AF method. If the condition C16 is not satisfied, the process proceeds to step SP87.

In step SP87, a process similar to that performed in step SP35 is performed. More specifically, in step SP87, it is determined whether or not the condition C5 is satisfied, that is, whether or not the contrast of the object image received by the AF module 20 is lower than the predetermined threshold TH5 (<TH4). If the condition C5 is satisfied, it is determined that the object image obtained by the AF module 20 is not clear enough to determine the in-focus lens position using the phase-difference AF method. Accordingly, the process proceeds to step SP89, where the contrast AF method, which provides high accuracy, is determined as the optimum AF method. If the condition C5 is not satisfied, the process proceeds to step SP90.

In step SP90, the combined method in which not only the phase-difference AF method but also the contrast AF method is used is determined as the optimum AF method. The "combined method" selected in SP90 may be similar to that selected in step SP38. According to the combined method selected in step SP38, the phase-difference AF and the contrast AF are not performed simultaneously. However, the present invention is not limited to this. For example, in the case in which the phase-difference AF and the contrast AF can be performed simultaneously as in the second embodiment, the combined method as described below may also be used.

That is, the focusing lens is moved to the in-focus lens position determined by the phase-difference AF method, and the evaluation values for the contrast AF method are acquired at each lens position while the focusing lens is being moved. Then, the lens position corresponding to the peak of the curve obtained by plotting the evaluation values for the contrast AF method is determined as the final in-focus lens position, and the focusing lens is moved to the thus-determined peak lens position. If the focusing lens reaches the in-focus lens position determined by the phase-difference AF method before the peak lens position corresponding to the peak of the evaluation values is detected, the contrast AF operation is continued. More specifically, the AF driving operation is performed in which the peak lens position is detected by moving the lens while calculating the evaluation values. If the peak lens position is detected before the lens reaches the in-focus lens position determined by the phase-difference AF method, the lens is moved to the peak lens position and the AF driving operation is finished. Accordingly, the AF driving operation can be more quickly finished.

The AF operation can be performed using the above-described combined method.

3. Third Embodiment

Similar to the second embodiment, an imaging apparatus according to a third embodiment is capable of simultaneously executing the phase-difference AF method and the contrast AF method. In the following description, differences from the second embodiment will be mainly explained.

Figure 25:
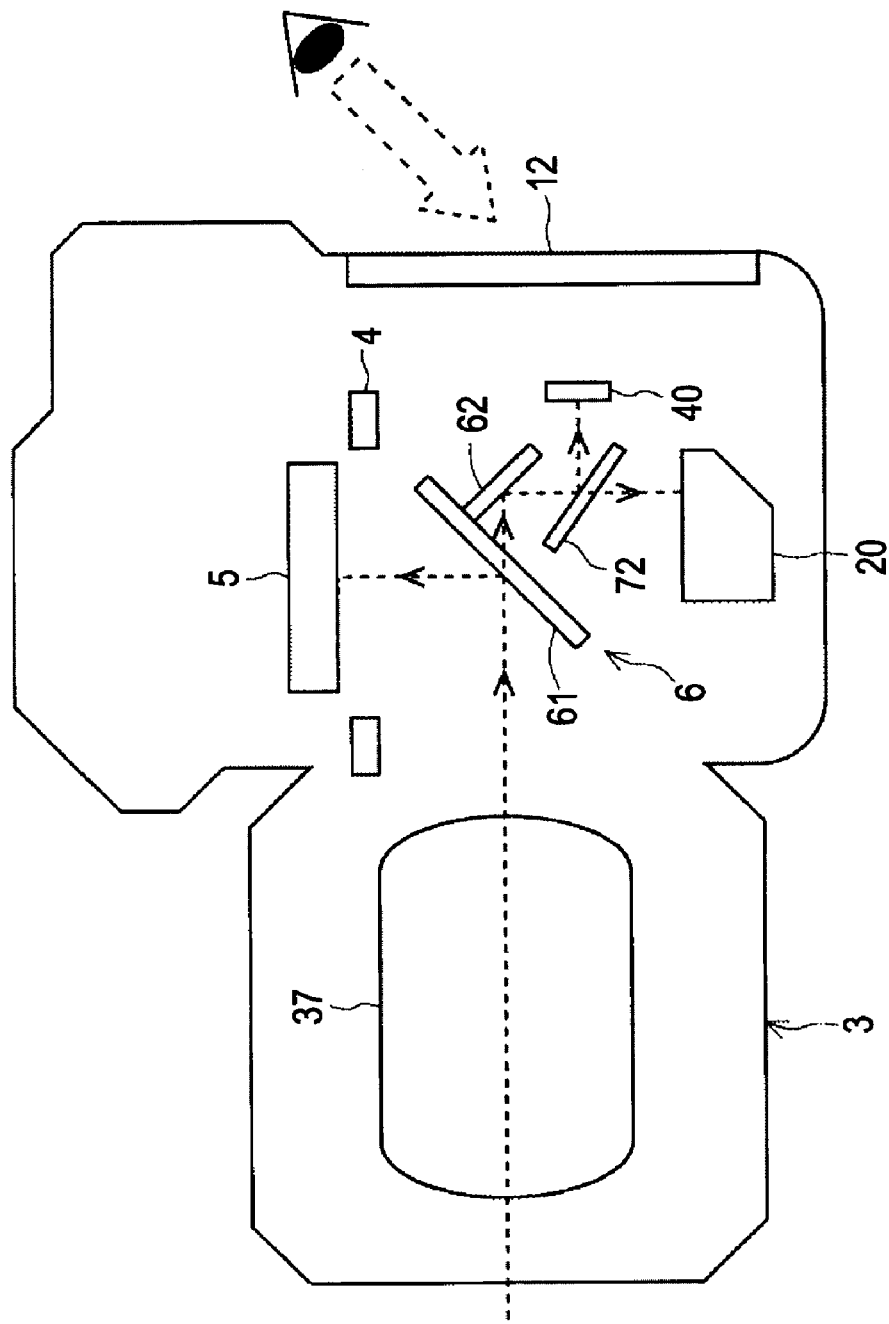
FIG. 25 is a sectional view illustrating the schematic structure of an imaging apparatus according to a third embodiment.

FIG. 25 is a sectional view of the structure of an imaging apparatus 1C according to the third embodiment. The imaging apparatus 1C has no optical finder, and the composition is determined using the live view display.

The imaging apparatus 1C is in the state shown in FIG. 25 until the state of the release button 11 is changed to the fully pressed state S2, that is, while the composition determination operation is being performed. More specifically, the main mirror 61 is placed on the optical path (imaging optical path) extending from the imaging lens unit 3 to the imaging device 5. Light reflected by the main mirror 61 is incident on the pentamirror 65, which changes the direction of light toward the imaging device 5. The imaging device 5 is positioned parallel to the optical path (imaging optical path) extending from the imaging lens unit 3 to the imaging device 5 and perpendicular to an optical axis of the light reflected by the main mirror 61.

In the imaging apparatus 1C, the image can be continuously captured by the image pickup device 5 in the composition determination operation. The imaging apparatus 1C presents the live view display using the image captured by the imaging device 5.

An in-focus lens-position determination operation can be performed by determining evaluation values for contrasts of a plurality of images obtained by the imaging device 5 and determining a lens position at which the evaluation value is optimized as the in-focus lens position. Then, the AF driving operation can be performed by moving the focusing lens to the thus-determined lens position. Thus, the imaging apparatus 1C is capable of performing the contrast AF using the image acquired by the imaging device 5.

Light that passes through the main mirror 61 is reflected downward by the sub mirror 62 and is incident on the AF module 20. The AF module 20 generates a phase-difference detection signal based on light incident thereon. The in-focus lens-position determination operation for determining the in-focus lens position and the AF driving operation for moving the focusing lens to the in-focus lens position can be performed by using the phase-difference detection signal. Thus, the imaging apparatus 1B is capable of executing the phase-difference AF method using the phase-difference detection signal obtained by the AF module 20. An optical element (half mirror) 72 is disposed between the sub mirror 62 and the AF module 20. A portion of the light that is incident on the optical element 72 is reflected by the optical element 72 and reaches the photometer 40. However, the structure of the photometer 40 is not limited to this. For example, the photometer 40 may also be arranged to receive a portion of light that travels from the main mirror 61 to the imaging device 5.

As described above, both the phase-difference AF method and the contrast AF method can be used until the state of the release button 11 is changed to the fully pressed state S2.

When the state of the release button 11 is changed to the fully pressed state S2, the imaging device 5 performs photoelectric conversion of the object image received at the time when the shutter 4 is opened, and thereby generates an image signal for the object. Thus, the final captured image (captured image data) of the object can be obtained.

The operation of the imaging apparatus 1C according to the third embodiment is basically the same as that of the imaging apparatus 1B according to the second embodiment. The operation of the third embodiment differs from that of the second embodiment in that the live view display is presented and the contrast AF is executed using the images obtained by the imaging device 5 instead of the images obtained by the imaging device 7.

The imaging apparatus 1C also provides effects similar to those obtained by the imaging apparatus 1B according to the second embodiment.

4. Modification

Although embodiments of the present invention has been described, the present invention is not limited to the above description.

Figure 26:
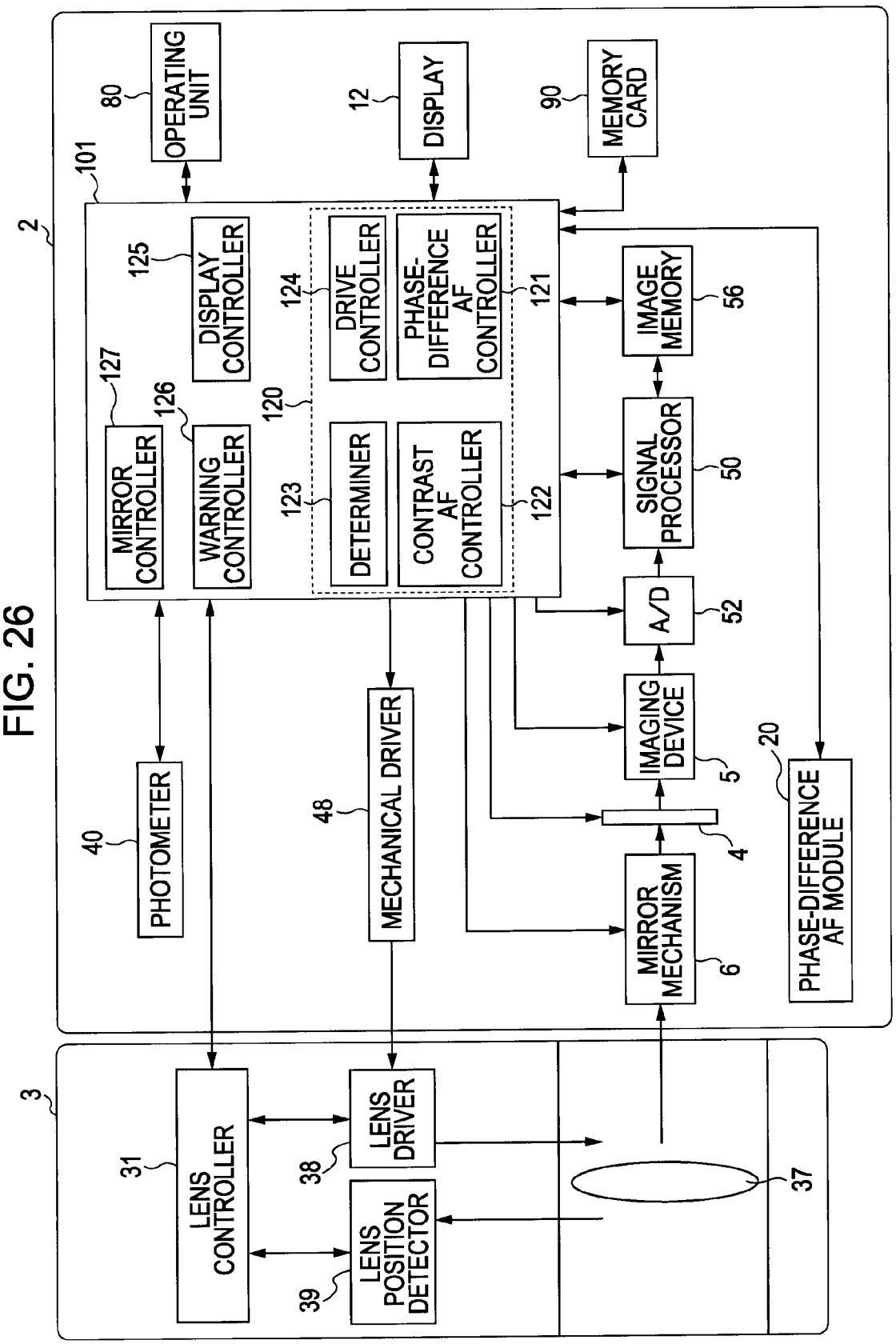
FIG. 26 is a sectional view illustrating the schematic structure of a modification of the imaging apparatus.

For example, in the first embodiment, the lens group 37 included in the imaging lens unit 3 is driven by the lens driver 38 provided in the imaging lens unit 3. However, the present invention is not limited to this. More specifically, as shown in FIG. 26, a mechanical driver (mechanical driving mechanism) 48 may be provided in the main body of the imaging apparatus 1C, and the lens group 37 included in the imaging lens unit 3 may be driven by the mechanical driver 48.

In the above-described embodiments, if the automatic switching mode is selected as the AF mode, an optimum AF method is determined by the determiner 123 and is indicated in the recommendation display. Then, the optimum AF method is automatically used in the AF control operation. However, the present invention is not limited to this. For example, after the optimum AF method is determined by the determiner 123, the AF control operation using the optimum AF method can be automatically performed without displaying the result of the determination on the recommendation display. Alternatively, after the optimum AF method is determined by the determiner 123, only the process of displaying the result of the determination on the recommendation display may be performed.

In addition, in the above-described embodiments, an optimum AF method is selected from among three AF methods including the "phase-difference AF method" in which the phase-difference detection signal obtained by the AF module 20 is used, the "contrast AF method" in which the evaluation values corresponding to the contrasts are used, and the "combined method" in which the "phase-difference AF method" and the "contrast AF method" are used in combination. However, the present invention is not limited to this. For example, the optimum AF method can also be selected from among two AF methods including the "phase-difference AF method" and the "contrast AF method". Alternatively, the optimum AF method can also be selected from among two AF methods including the "phase-difference AF method" and the "combined method", or from among two AF methods including the "contrast AF method" and the "combined method".

It should be understood by those skilled in the art that various modifications, combinations, sub-combinations and alterations may occur depending on design requirements and other factors insofar as they are within the scope of the appended claims or the equivalents thereof.

What is claimed is:

1. An imaging apparatus comprising:
   an imaging device configured to receive light from an object through an imaging lens at a predetermined imaging plane and to perform photoelectric conversion of an object image to generate a captured image;
   phase-difference detecting means for receiving the light from the object and generating a phase-difference detection signal corresponding to a focus level of the object image;
   evaluation-value calculating means for calculating a predetermined evaluation value corresponding to a contrast of the object image on the basis of the captured image;
   determining means for selecting an optimum AF method from among a plurality of AF methods in which the phase-difference detection signal obtained by the phase-difference detecting means and the predetermined evaluation value based on the captured image are used selectively or in combination, the optimum AF method being selected in accordance with image-capturing conditions of the object; and
   drive control means for performing an AF operation by driving the imaging lens using the selected optimum AF method, wherein
   the drive control means drives the imaging lens using an AF method in which only one of the phase-difference detection signal and the predetermined evaluation value is used to complete the AF operation when only one of a phase-difference AF method and a contrast AF method is selected as the optimum AF method,
   wherein the determining means determines that an AF method using the predetermined evaluation value is the optimum AF method either when a focus level detected using a result of comparison between a low-frequency contrast component and a high-frequency contrast component of the captured image is larger than a first predetermined level or when a difference between a current lens position and a lens position determined as an in-focus lens position by the phase-difference detection signal is smaller than a predetermined threshold and when a focus level detected using a result of comparison between a low-frequency contrast component and a high-frequency contrast component of the captured image is smaller than a predetermined level.

2. The imaging apparatus according to claim 1, wherein the imaging apparatus is not capable of simultaneously performing a live view display operation of the object image and an AF operation using a first AF method in which the phase-difference detection signal is used, and
   wherein the imaging apparatus further comprises:
   a warning control unit configured to issue a warning that a composition determination method will be changed when the first AF method is determined to be the optimum AF method by the determining unit while the live view display operation of the object image is being performed.

3. The imaging apparatus according to claim 1, wherein the imaging apparatus is not capable of simultaneously performing a composition determination operation using an optical finder and an AF operation using an AF method using the predetermined evaluation value, and
   wherein the imaging apparatus further comprises:
   a warning control unit configured to issue a warning that a composition determination method will be changed when the AF method using the predetermined evaluation value is determined to be the optimum AF method by the determining unit while the composition determination operation using the optical finder is being performed.

4. The imaging apparatus according to claim 1, further comprising:
   a main reflective surface removably disposed on an optical path of the object image from the imaging lens;
   a finder optical system configured to guide a light beam that is reflected by the main reflective surface disposed on the optical path and that functions as an observation light beam to a finder window; and
   a warning control unit configured to issue a warning that a composition determination method will be changed, and
   wherein the finder optical system is not capable of guiding the object image toward the finder window when the main reflective surface is removed from the optical path,
   wherein the imaging device is configured to generate the captured image while the main reflective surface is disposed on the optical path but is not capable of generating the captured image while the main reflective surface is removed from the optical path, and
   wherein the warning control unit issues the warning when the determining unit determines that an AF method using the predetermined evaluation value is the optimum AF method while the main reflective surface is disposed on the optical path.

5. An imaging apparatus comprising:
   an imaging device configured to receive light from an object through an imaging lens at a predetermined imaging plane and to perform photoelectric conversion of an object image to generate a captured image;

a phase-difference detector configured to receive the light from the object and to generate a phase-difference detection signal corresponding to a focus level of the object image;

an evaluation-value calculator configured to calculate a predetermined evaluation value corresponding to a contrast of the object image on the basis of the captured image;

a determining unit configured to select an optimum AF method from among a plurality of AF methods in which the phase-difference detection signal obtained by the phase-difference detecting unit and the predetermined evaluation value based on the captured image are used selectively or in combination, the optimum AF method being selected in accordance with image-capturing conditions of the object;

a drive control unit configured to perform an AF operation by driving the imaging lens using the selected optimum AF method, wherein the drive control unit drives the imaging lens using an AF method in which only one of the phase-difference detection signal and the predetermined evaluation value is used to complete the AF operation when only one of a phase-difference AF method and a contrast AF method is selected as the optimum AF method;

a main reflective surface removably disposed on an optical path of the object image from the imaging lens;

a display unit configured to successively display a plurality of images acquired by the imaging device in time series while the main reflective surface is removed from the optical path; and a warning control unit configured to issue a warning that a composition determination method will be changed, and wherein the phase-difference detecting unit does not detect the phase-difference detection signal while the main reflective surface is removed from the optical path and detects the phase-difference detection signal using a part of light that passes through the main reflective surface while the main reflective surface is disposed on the optical path, wherein the warning control unit issues the warning when the determining unit determines that a first AF method using the phase-difference detection signal is the optimum AF method while the main reflective surface is removed from the optical path and the display unit is successively displaying the plurality of images.

6. An imaging apparatus comprising:

an imaging device configured to receive light from an object through an imaging lens at a predetermined imaging plane and to perform photoelectric conversion of an object image to generate a captured image;

a phase-difference detector configured to receive the light from the object and to generate a phase-difference detection signal corresponding to a focus level of the object image;

an evaluation-value calculator configured to calculate a predetermined evaluation value corresponding to a contrast of the object image on the basis of the captured image;

a determining unit configured to select an optimum AF method from among a plurality of AF methods in which the phase-difference detection signal obtained by the phase-difference detecting unit and the predetermined evaluation value based on the captured image are used selectively or in combination, the optimum AF method being selected in accordance with image-capturing conditions of the object; and a drive control unit configured to perform an AF operation by driving the imaging lens using the selected optimum AF method, wherein the drive control unit drives the imaging lens using an AF method in which only one of the phase-difference detection signal and the predetermined evaluation value is used to complete the AF operation when only one of a phase-difference AF method and a contrast AF method is selected as the optimum AF method, wherein the determining unit determines that an AF method using the predetermined evaluation value is the optimum AF method either when a focus level detected using a result of comparison between a low-frequency contrast component and a high-frequency contrast component of the captured image is larger than a first predetermined level or when a difference between a current lens position and a lens position determined as an in-focus lens position by the phase-difference detection signal is smaller than a predetermined threshold and when a focus level detected using a result of comparison between a low-frequency contrast component and a high-frequency contrast component of the captured image is smaller than a predetermined level.

7. The imaging apparatus according to claim 6, further comprising:
a display unit configured to display a result of the determination performed by the determining unit.

8. The imaging apparatus according to claim 6, further comprising:
a photometer configured to measure an intensity of the light from the object;
wherein the determining unit determines that an AF method using the phase-difference detection signal is the optimum AF method when an amount of light received by the phase-difference detecting unit and an amount of light received by the photometer are smaller than respective thresholds.

9. The imaging apparatus according to claim 6, wherein the determining unit determines that an AF method using the predetermined evaluation value is the optimum AF method when a plurality of in-focus lens positions are detected by the phase-difference detecting unit.

10. The imaging apparatus according to claim 6, wherein the determining unit determines that an AF method using the phase-difference detection signal is the optimum AF method when the difference between the current lens position and the lens position determined as the in-focus lens position by the phase-difference detection signal is larger than the predetermined threshold.

11. The imaging apparatus according to claim 6, wherein the determining unit determines that an AF method using the phase-difference detection signal is the optimum AF method when the focus level detected using the result of the comparison between the low-frequency contrast component and the high-frequency contrast component of the captured image is smaller than a second predetermined level.

12. The imaging apparatus according to claim 6, further comprising:
a setting unit configured to set an AF mode selected from a plurality of modes including a first mode in which a first AF method that uses the phase-difference detection signal is continuously used, a second mode in which a second AF method that uses the predetermined evaluation value is continuously used, and a third mode in which one of the plurality of AF methods is selectively used.

* * * * *